US012453654B2

(12) United States Patent
Chauhan et al.

(10) Patent No.: US 12,453,654 B2
(45) Date of Patent: Oct. 28, 2025

(54) DEVICES AND METHODS FOR INTRAVITREAL INJECTION OF SUBSTANCES

(71) Applicant: University of Florida Research Foundation, Inc., Gainesville, FL (US)

(72) Inventors: Anuj Chauhan, Gainesville, FL (US); Russell Macoon, Gainesville, FL (US); Keith G. Christopher, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 835 days.

(21) Appl. No.: 17/769,922

(22) PCT Filed: Nov. 12, 2020

(86) PCT No.: PCT/US2020/060077
§ 371 (c)(1),
(2) Date: Apr. 18, 2022

(87) PCT Pub. No.: WO2021/113041
PCT Pub. Date: Jun. 10, 2021

(65) Prior Publication Data
US 2022/0378610 A1    Dec. 1, 2022

Related U.S. Application Data

(60) Provisional application No. 62/942,916, filed on Dec. 3, 2019.

(51) Int. Cl.
*A61M 5/20*    (2006.01)
*A61F 9/00*    (2006.01)
(Continued)

(52) U.S. Cl.
CPC .............. *A61F 9/0017* (2013.01); *A61K 9/06* (2013.01); *A61K 31/5377* (2013.01); *A61M 5/2033* (2013.01); *A61K 9/0051* (2013.01)

(58) Field of Classification Search
CPC .... A61M 2005/202; A61M 2005/2073; A61M 2005/2451; A61M 5/2066; A61M 5/2033
See application file for complete search history.

(56) References Cited

U.S. PATENT DOCUMENTS 6,575,939 B1   6/2003  Bruenl
6,899,717 B2   5/2005  Weber
(Continued)

OTHER PUBLICATIONS

ISR mailed Feb. 5, 2021, pp. 1-14.
(Continued)

*Primary Examiner* — Laura A Bouchelle
*Assistant Examiner* — Sarah Dympna Grasmeder
(74) *Attorney, Agent, or Firm* — Thomas | Horstemeyer LLP.

(57) ABSTRACT

In accordance with the purpose(s) of the present disclosure, as embodied and broadly described herein, the disclosure relates to an auto-injector device that can be used for injection of ophthalmological formulations. The auto-injector device can function in two stages, where a lubricious material is released in a first stage and a drug delivery composition is released in a second stage. The present disclosure provides for method of using these injector devices.

5 Claims, 18 Drawing Sheets

(51) Int. Cl.
*A61K 9/06* (2006.01)
*A61K 31/5377* (2006.01)
*A61K 9/00* (2006.01)

(56) References Cited

U.S. PATENT DOCUMENTS

| | | | |
|---|---|---|---|
| 7,449,012 | B2 | 11/2008 | Young et al. |
| 7,862,543 | B2 | 1/2011 | Potter et al. |
| 9,636,253 | B1 | 5/2017 | Andino |
| 2011/0009815 | A1* | 1/2011 | Stormer-Talleur ............ A61M 5/2033 604/68 |
| 2020/0129705 | A1 | 4/2020 | Yeh |

OTHER PUBLICATIONS

Cunha-Vaz J., Bernardes, R., Lobo, C. Blood-retinal barrier. Eur J Ophthalmol. (2011) 21: S3-S9.

Duvvuri, S., Majumdar, S., Mitra, A. Drug delivery to the retina: challenges and opportunities. Expert Opinion on Biological Therapy. (2003) 3, #1:45-56.

Gillies, M., Simpson, J., Billson, F., et al. Safety of an Intravitreal Injection of Triamcinolone: Results from a Randomized Clinical Trial. Arch Ophthalmol. (2004) 122, #3:336-340.

A: Rowe-Rendleman, C., Durazo, S., Kompella, U. Drug and Gene Delivery to the Back of the Eye: From Bench to Bedside. Invest Ophthalmol Vis Sci. (2014) 55:2714-2730.

Myers (Provencher), L., Almeida D., Abràmoff M. Intravitreal Injection Technique: A Primer for Ophthalmology Residents and Fellows. EyeRounds.org. (Jan. 6, 2015). Retrieved from http://www.EyeRounds.org/tutorials/intravitreal-injection/.

Ghate, D., Edelhauser, H. Ocular drug delivery. Expert Opin Drug Deliv. (2006) 3 #2: 275-287.

Moshfeghi, D., Kaiser, P., et al. Acute endophthalmitis following intravitreal triamcinolone acetonide injection. American Journal of Opthalmology. (2003) 136, #5:791-796.

Allmendinger, A. Rheological characterization and injection forces of concentrated protein formulations: an alternative predictive model for non-Newtonian Solutions. Eur J Pharm Biopharm. (2014). 87 #2: 318-328.

Pharmaceutical technology editors. Injecting Highly Viscous Drugs. Pharmaceutical Technology. (2014) 38 #11.

Cilurzo, Francesco. Injectability Evaluation: An Open Issue. AAPS PharmSciTech. (2011) 12 #2: 604-609.

Didomenico, A. Measurement and prediction of single and multi-digit finger strength. Ergonomics. (2003). 46 #15: 1531-1548.

Philbrick, D. Medical device OEM's and contract manufacturers: Designing Auto-Injectors for Multiple Drug Viscosities. Economy Spring. Retrieved from https://www.mw-ind.com/whitepapers/auto-injectors/attachment/eco-whitepaper-auto-injectors/.

Dinikar, C. "Anaphylaxis in Children: Current Understanding and Key Issues in Diagnosis and Treatment." Current Allergy and Asthma Reports. (2012) 12:6 641-649.

Hariprasad, S. "Suprachoroidal Administration for Retinal Drug Delivery" Retinal Physician. (2016) 13 20-23.

"My Vision Test." Smaller needles and beveled intravitreal injection technique offer superior results. N.p., Mar. 8, 2011.

D'souza, A., Shegokar, R. "Polyethylene glycol (PEG): a versatile polymer for pharmaceutical applications." Expert Opinion on Drug Delivery. 13:9 1257-1275.

Kadajji, V., Betageri, G. "Water Soluble Polymers for Pharmaceutical Applications." Polymers. 3 1972-2009.

\* cited by examiner

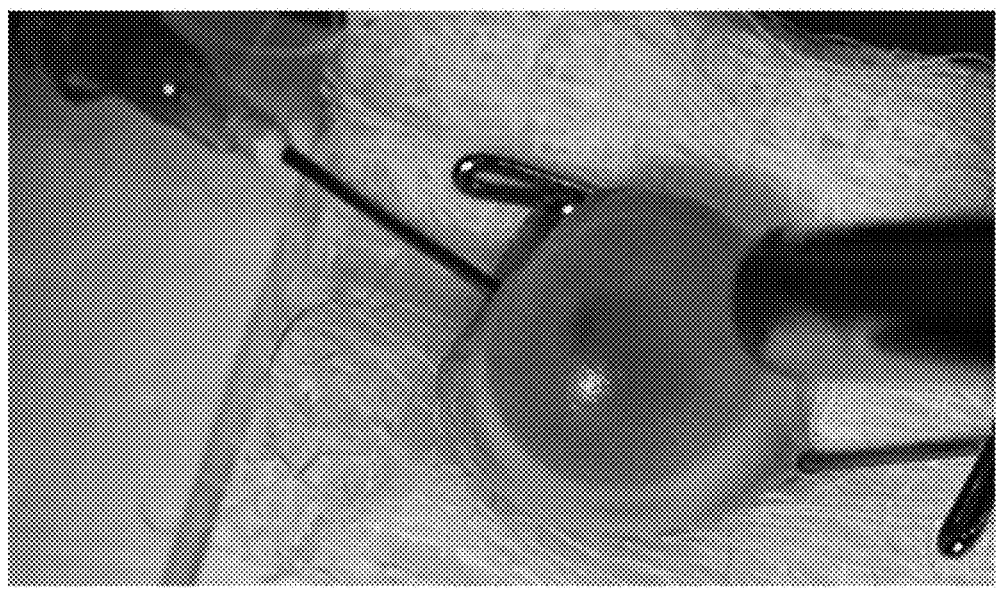
FIG. 7
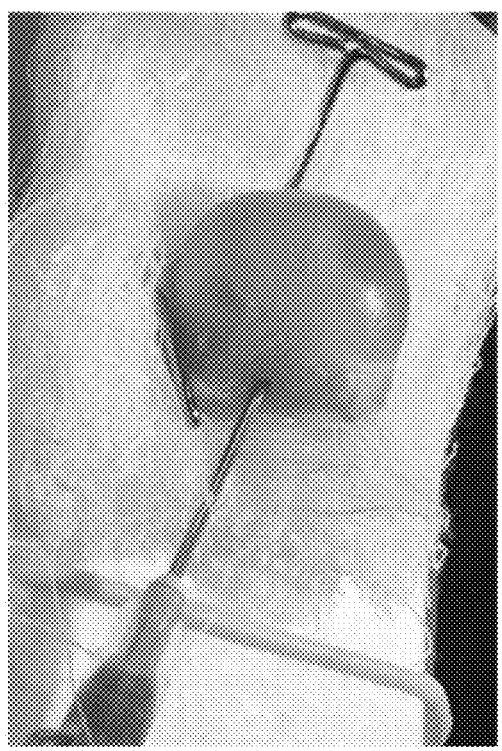  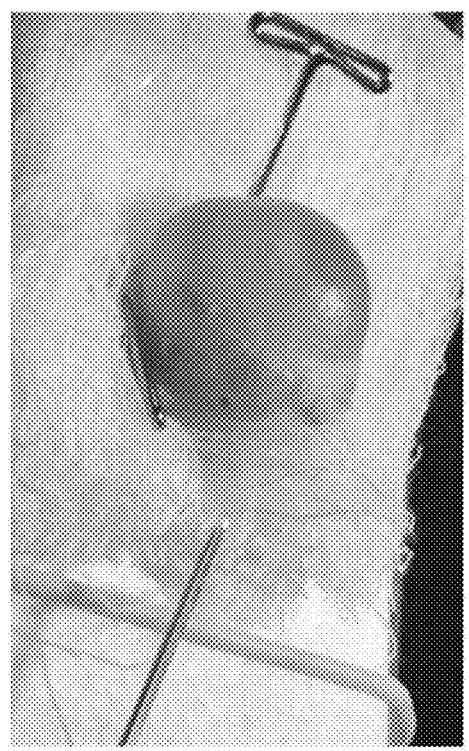
FIG. 8A          FIG. 8B

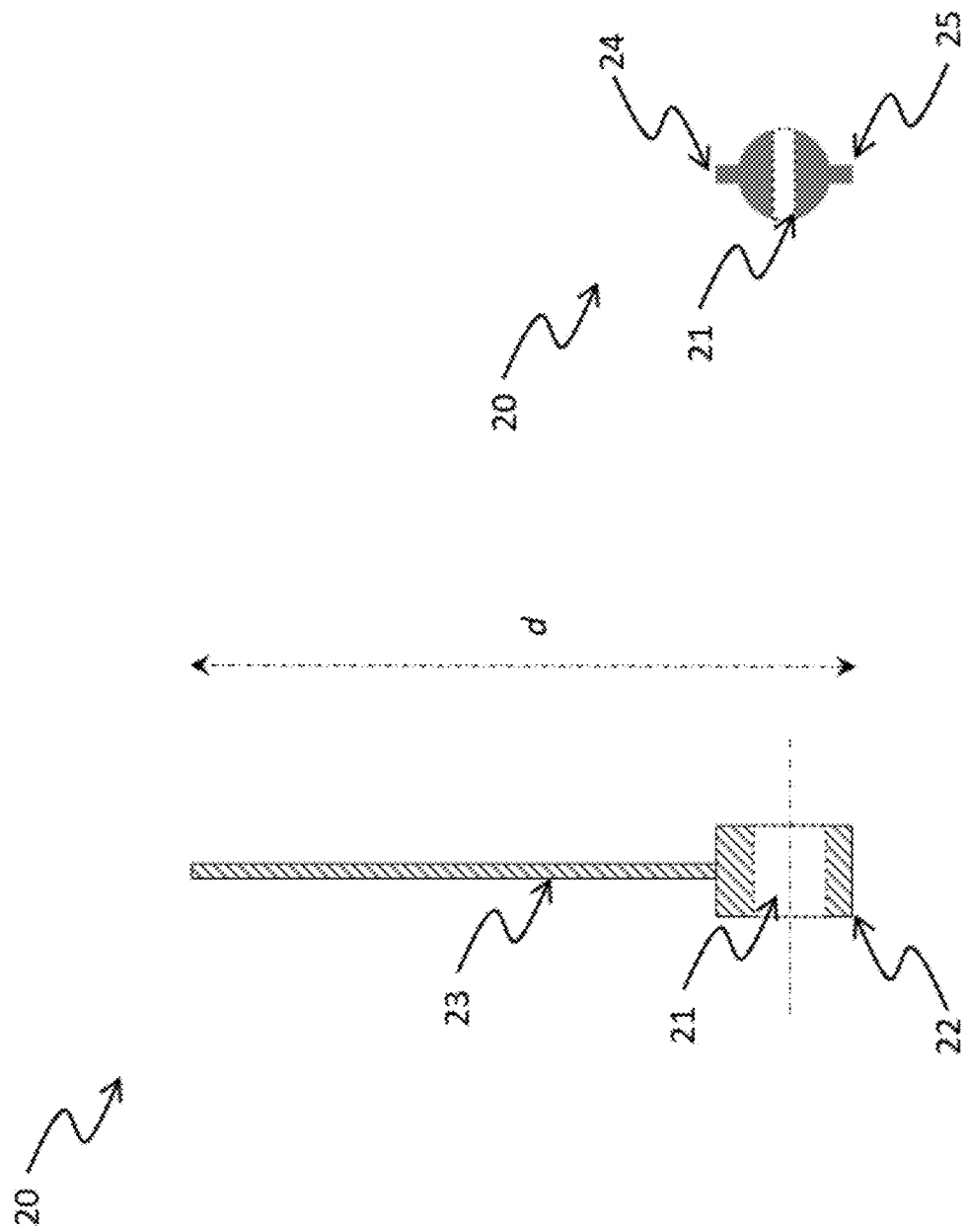

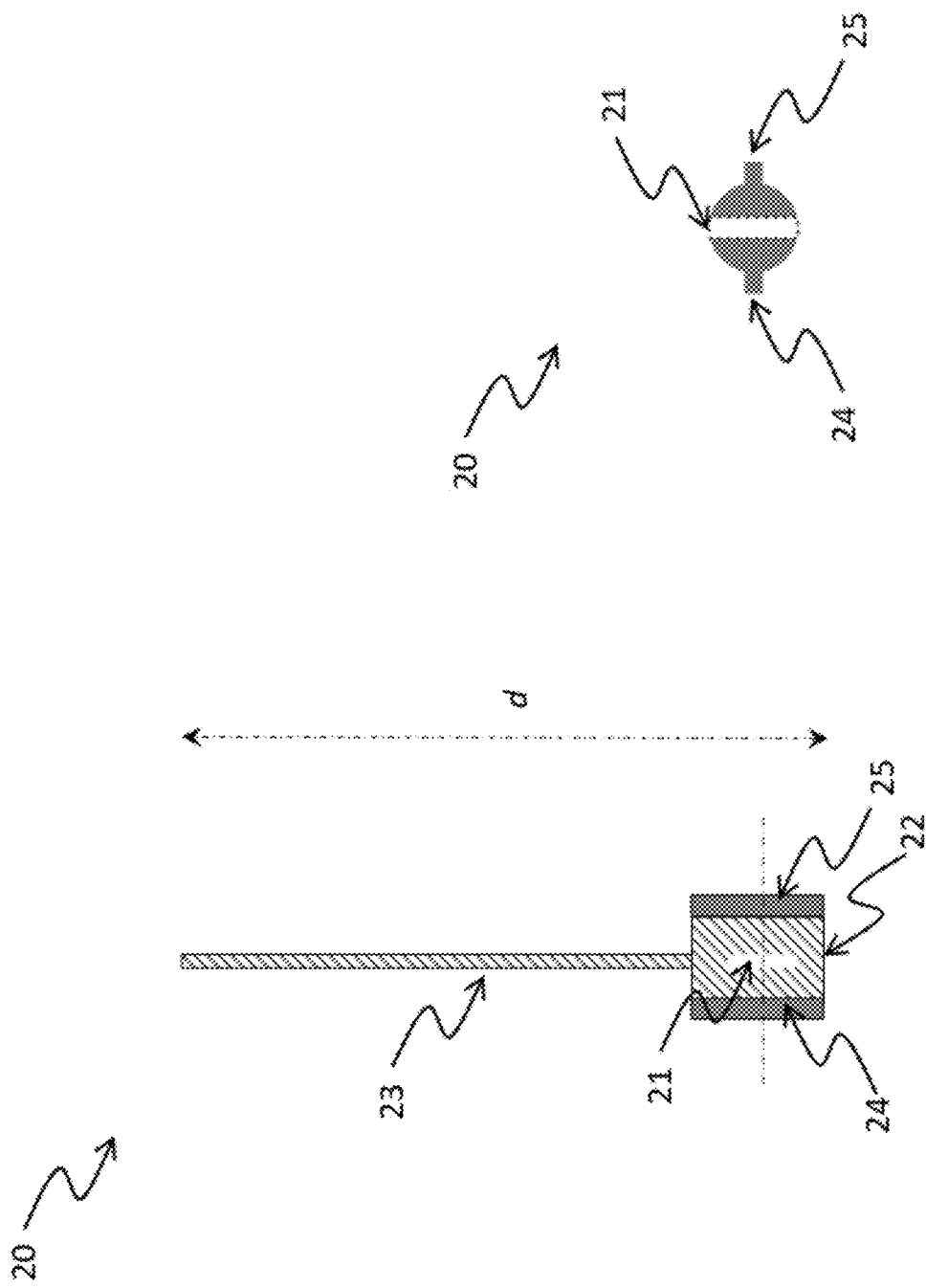

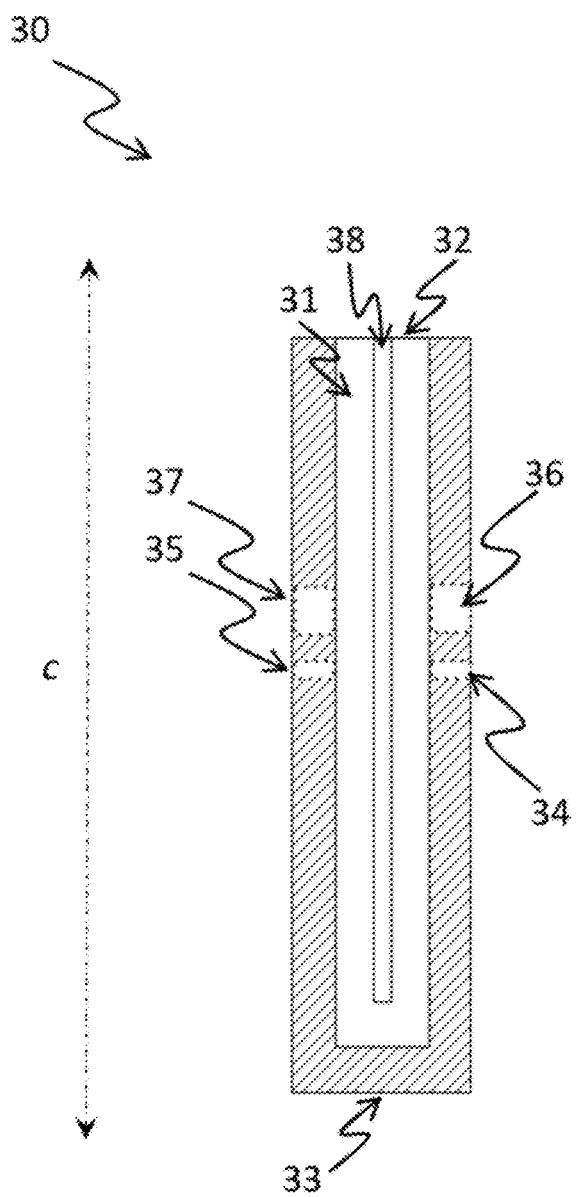
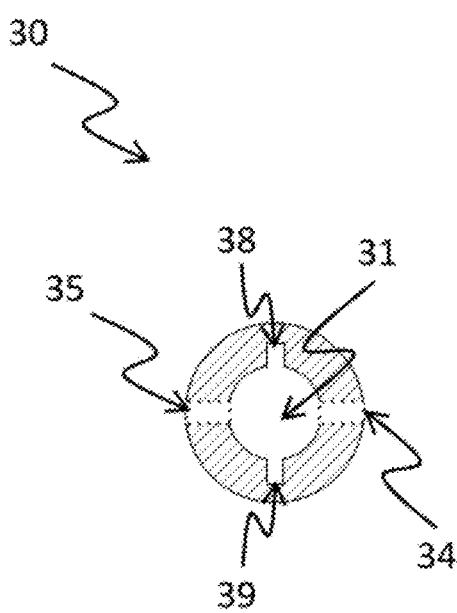
FIG. 14A
FIG. 14B

DEVICES AND METHODS FOR INTRAVITREAL INJECTION OF SUBSTANCES

CROSS-REFERENCE TO RELATED APPLICATION

This application is the 35 U.S.C. § 371 national stage of PCT application having serial number PCT/US2020/060077, filed on Nov. 12, 2020. This application also claims priority to U.S. provisional application entitled "DEVICES AND METHODS FOR INTRAVITREAL INJECTION OF SUBSTANCES," having Ser. No. 62/942,916 filed on Dec. 16, 2019, which are entirely incorporated herein by reference.

BACKGROUND

Ophthalmological injection of a gel-based, viscous or semi-solid drug formulation are gaining focus for delivery of therapeutic agents to the eye, particularly for the use of extended release formulations that permit release of drugs over a period of weeks or months. However, despite the value of such formulations, their use can present a number of significant clinical challenges. First, the viscosity of these formulations makes the force required to inject much higher than liquid solutions. Second, it is extremely difficult to accurately measure the volume of drug formulation released in intravitreal injections comprising a gel or highly viscous material, e.g., air can get trapped in the syringe when this type formulation is loaded. The foregoing issues can lead to a very difficult injection procedures when using conventional devices in an outpatient setting, e.g., a physician office. Moreover, the foregoing issues can be particularly challenging if an injection is targeted for the vitreous humor in the posterior segment of the eye when using conventional devices. However, if an ophthalmological implant comprising a gel-based, viscous, or semi-solid formulation cannot be injected using a conventional device, then surgery may be required to administer the implant to the target area. Such surgical procedures present their own clinical issues, and are less desirable for an injection or implantation of a therapeutic formulation that must be administered on a regular schedule over a sustained period of time. There is a clear need for an auto-injector device that can be used in an outpatient setting for administration of gel-based, viscous or semi-solid drug formulation.

Despite research into gel-based, viscous or semi-solid drug formulation for ophthalmological use, including extended release of therapeutic agents, there remain significant challenges to their widespread adoption for ophthalmological use, particularly intravitreal injection. These needs and other needs are satisfied by the present disclosure.

SUMMARY

Embodiments of the present disclosure provide for auto-injector devices (e.g., two stage auto-injector devices), methods for using auto-injector devices, methods of making auto-injector devices, methods for two stage application of compositions, methods of treating eye disorders, and the like. For example the auto-injector device can injection drug compositions (e.g., ophthalmological formulations) that can include one or more therapeutics.

In accordance with the purpose(s) of the present disclosure, as embodied and broadly described herein, the disclosure, in one aspect, relates to an auto-injector device that can be used for injection of ophthalmological formulations comprising a carrier composition and at least one therapeutic agent, and methods for treating an eye disorder using the disclosed auto-injector device. In particular aspects, the carrier composition can be a gel, semi-solid, or solid material, or combinations thereof.

In an aspect, the present disclosure pertains to an auto-injector device comprising: an auto-injector injector body; an auto-injector syringe plunger; an auto-injector spring; an auto-injector preparatory pin; and an auto-injector injection pin; optionally one or more of the following: wherein the auto-injector body has an elongated shape with a cavity therein having a longitudinal axis; wherein the cavity has a closed end at one end of the longitudinal axis and an open end distal to the closed end; wherein the auto-injector body has a first body preparatory pin opening, a second body preparatory pin opening, and a body injection pin opening; wherein the auto-injector spring has a first end and a second end; wherein the auto-injector syringe plunger has a syringe plunger pin slot, a syringe plunger spring contact end, and a syringe plunger body end; wherein the auto-injector spring first end is contact with the closed end; wherein the auto-injector spring second end is contact with the syringe plunger spring contact end of the auto-injector syringe plunger; wherein the syringe plunger body end of the auto-injector syringe plunger can engage the auto-injector injection pin passing through the body preparatory pin opening and through the syringe plunger pin slot at a position proximal to syringe plunger spring contact end; wherein the auto-injector injection pin comprises an injection pin mid-section and an injection pin outer-section; wherein the injection pin mid-section has a longitudinal edge that is disposed closer to the center of the injection pin than a longitudinal edge of the outer-section; and wherein the injection pin can pass through the body injection pin open and engage with the syringe plunger pin slot.

The present disclosure also provides for a two stage auto-injector device comprising: an injector body, a syringe plunger, a compression spring, a preparatory pin, an injection pin, and an optional syringe including a first compartment including a lubricious material and a second compartment including a drug delivery composition, wherein the compression spring is compressed inside the injector body such that syringe plunger is locked into place by the preparatory pin, wherein the preparatory pin is positioned through a first body preparatory pin opening in the injector body, and a syringe plunger pin slot, and a second body preparatory pin opening on the other side, wherein the preparatory pin, when locked into place, prevents the compressed spring from moving the syringe plunger, wherein the injection pin is positioned in a hole in the injector body, wherein in a first stage the device is configured to release the lubricious material upon removal of the preparatory pin, wherein in a second stage, that follows the first stage, the device is configured to release the drug delivery composition upon removal of the injection pin.

The present disclosure provides for a two stage auto-injector device comprising: an injector body, a syringe plunger, a compression spring, a preparatory pin, and an injection pin, wherein the compression spring is compressed inside the injector body such that syringe plunger is locked into place by the preparatory pin, wherein the preparatory pin is positioned through a first body preparatory pin opening in the injector body, and a syringe plunger pin slot, and a second body preparatory pin opening on the other side, wherein the preparatory pin, when locked into place, prevents the compressed spring from moving the syringe plunger, wherein the injection pin is positioned in a hole in the injector body, wherein in a first stage the device is configured to release a lubricious material upon removal of the preparatory pin, wherein in a second stage, that follows the first stage, the device is configured to release a drug delivery composition upon removal of the injection pin.

In a further aspect, the present disclosure pertains to a method for treating an eye disorder, the method comprising using a disclosed auto-injector device to inject into a portion of an eye a therapeutic composition (e.g. drug composition); optionally wherein the therapeutic composition comprises a carrier composition and at least one therapeutic agent.

In a further aspect, the present disclosure pertains to a kit for treating an eye disorder comprising a disclosed auto-injector device, and one or more of: a disclosed ophthalmological formulations comprising a carrier composition and at least one therapeutic agent; a disclosed carrier composition; at least one therapeutic agent; a syringe; a needle, instructions for use of the auto-injector device; or instructions for treating an eye disorder; wherein the disclosed auto-injector device comprises a disclosed auto-injector injection pin; a disclosed auto-injector syringe plunger; a disclosed auto-injector body; a disclosed auto-injector preparatory pin; a disclosed auto-injector spring Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4A is a photographic image of a disclosed auto-injector device prior to an injection procedure with the preparatory pin engaged and the injection pin in the unactuated position. FIG. 4B is a photographic image of a disclosed auto-injector device at step 1 of an injection procedure with the preparatory pin having been removed, but with the injection pin remaining in the unactuated position. As shown, with the removal of the preparatory pin, the syringe plunger has moved and thereby pushed out excess gel and trapped air. FIG. 4C is a photographic image of a disclosed auto-injector device at step 2 of an injection procedure with the preparatory pin having been removed, and the injection pin engaged in the actuated position, thereby having pushed out the remaining gel from the syringe.

FIG. 6A shows a photographic image of a disclosed auto-injector device inserted into a rabbit cadaver eye showing that the preparatory pin has already been removed and thereby partially releasing the spring. At this point, the injector pin remains in the unactuated position. Thus, step 1 of the injection procedure has concluded, but step 2 has not been actuated. FIG. 6B shows a photographic image of a disclosed auto-injector device inserted into a rabbit cadaver eye showing that the preparatory pin has already been pulled, and with injector pin in the actuated position by pushing the injection into injector body, releasing the spring, which provides the force to further push the plunger such that gel loaded in the syringe is expunged through the needle into the rabbit cadaver eye.

FIG. 7 shows a representative photographic image of injection of a gel formulation into a rabbit cadaver eye. In this study, the gel formulation comprised a blue dye to provide enhanced contrast of the gel formulation within the rabbit cadaver eye. The gel formulation used, when ejected creates a rod-like structure of gel in the eye which remains at the point of injection due to the density and gelatinous nature of the vitreous humor.

FIGS. 8A-8B show representative photographic images of rabbit cadaver eyes showing the injection and resulting injection wound following use of a representative disclosed auto-injection device. FIG. 8A shows a photographic image of a needle inserted through the sclera using a tunneled injection technique. As shown, the needle tip is positioned in the vitreous chamber and removed at a 90° angle. FIG. 8B shows a photographic image as the needle is removed, showing that a drug gel formulation dislodges from the bevel and remains in the eye. In this instance, a 22-gauge needle was used, and as shown in the photographic image, it is small enough to cause a self-sealing wound which results in minimal leakage from the injection site.

FIG. 10A shows a cross-sectional view of a representative disclosed auto-injector body, auto-injector injection pin, auto-injector syringe plunger, auto-injector preparatory pin, and auto-injector spring; in which the auto-injector preparatory pin and auto-injector injection pin are outside the auto-injector body and unengaged. FIG. 10B shows a cross-sectional view of a representative disclosed auto-injector body, auto-injector injection pin, auto-injector syringe plunger, auto-injector preparatory pin, and auto-injector spring; in which the auto-injector preparatory pin and auto-injector injection pin are fully inserted into the body. FIG. 10C shows a cross-sectional view of a representative disclosed auto-injector body, auto-injector injection pin, auto-injector syringe plunger, auto-injector preparatory pin, and auto-injector spring; in which the auto-injector preparatory pin has been removed, but with the auto-injector injection pin fully inserted into the body. FIG. 10D shows a cross-sectional view of a representative disclosed auto-injector body, auto-injector injection pin, auto-injector syringe plunger, auto-injector preparatory pin, and auto-injector spring; in which the auto-injector preparatory pin has been removed, and with the auto-injector injection pin is positioned in the actuated position, thereby allowing further movement of the auto-injector syringe plunger in the direction of the body opening versus the position of the plunger shown in FIG. 10C, when the injection pin is in the non-actuated position. For purposes of illustrating certain aspects, FIGS. 10A-10D do not depict a syringe with needle engaged with the syringe plunger.

FIG. 11A shows a cross-sectional plan view of a representative disclosed auto-injector body along the longitudinal axis with the auto-injector preparatory and injection pins shown not inserted into the body. FIG. 11B shows a cross-sectional view a representative disclosed auto-injector body along the plane of the dotted line shown through the auto-injector preparatory pin openings shown in FIG. 11A. In FIG. 11B, the auto-injector preparatory and injection pins are shown not inserted into the body. FIG. 11C shows a cross-sectional plan view of a representative disclosed auto-injector body along the longitudinal axis with the auto-injector preparatory and injection pins shown fully inserted into the body. FIG. 11D shows a cross-sectional view a representative disclosed auto-injector body along the plane of the dotted line shown through the auto-injector preparatory pin openings shown in FIG. 11C. In FIG. 11C, the auto-injector preparatory and injection pins are shown fully inserted into the body.

FIGS. 13A-13D show cross-sectional views of a representative disclosed auto-injector syringe plunger. FIG. 13A shows a cross-sectional view of a representative disclosed auto-injector syringe body along the longitudinal axis. FIG. 13B shows a cross-sectional view a representative disclosed auto-injector body along the plane of the dotted line shown through the syringe plunger pin slot in FIG. 13A. FIG. 13C shows a cross-sectional view of a representative disclosed auto-injector syringe body along the longitudinal axis, but from an orientation that is 90° to the view in FIG. 13A. FIG. 13D shows a cross-sectional view a representative disclosed auto-injector body along the plane of the dotted line shown through the syringe plunger pin slot in FIG. 13C.

FIGS. 14A-14B show cross-sectional views of a representative disclosed auto-injector body. FIG. 14A shows a cross-sectional plan view of a representative disclosed auto-injector body along the longitudinal axis. FIG. 14B shows a cross-sectional view a representative disclosed auto-injector body along the plane of the dotted line shown through the auto-injector preparatory pin openings shown in FIG. 14A.

Figure 1:
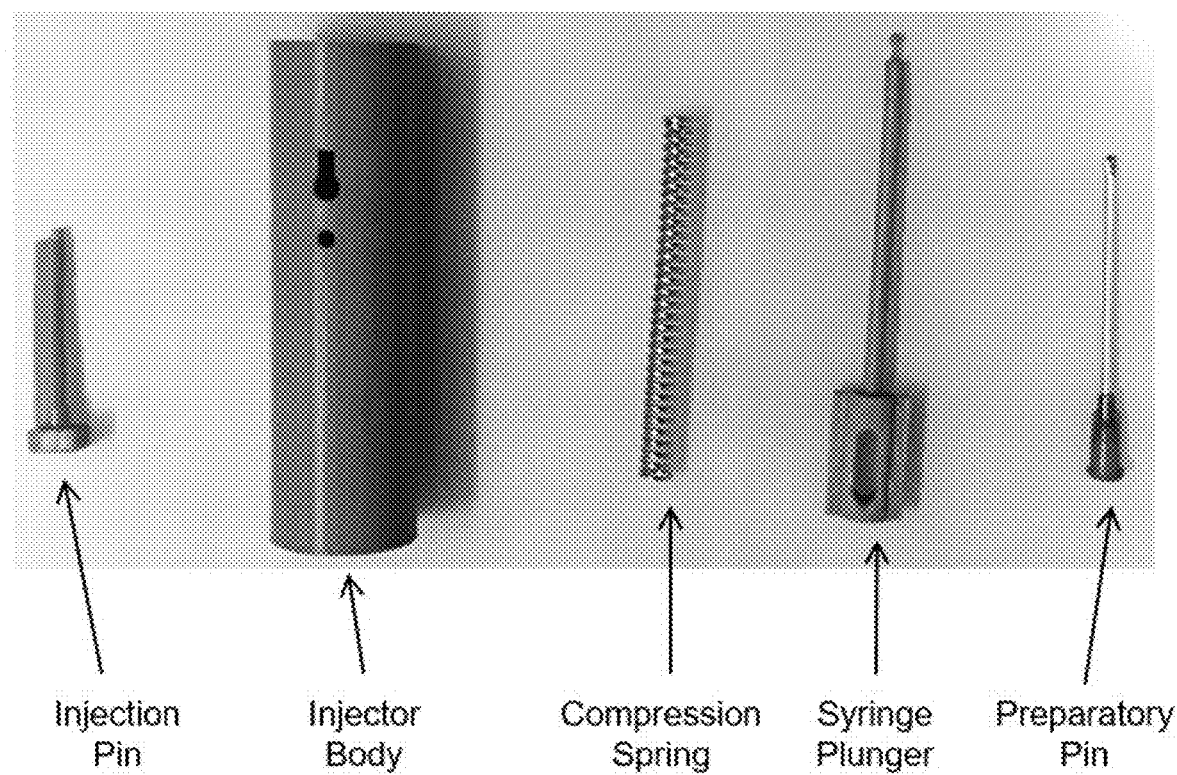
FIG. 1 is a photographic image of representative components of a disclosed auto-injector device. The representative components, as labeled and shown in the photographic image are: auto-injector injection pin; auto-injector body; auto-injector compression spring; auto-injector syringe plunger; and auto-injector preparatory pin.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

DRAWING REFERENCE NUMBERS

The following reference numbers are used herein throughout.

10 auto-injector injection pin
11 mid-section
12 outer-section
14 mid-section edge
15 outer-section edge
16 injection pin head
17 injection pin body
20 auto-injector syringe plunger
21 syringe plunger pin slot
22 syringe plunger spring contact end
23 syringe plunger body end
24 first syringe plunger guide
25 second syringe plunger guide
30 auto-injector body
31 body cavity
32 closed end
33 open end
34 first body preparatory pin opening
35 second body preparatory pin opening
36 first body injection pin opening
37 second body injection pin opening
38 first syringe plunger guide slot
39 second syringe plunger guide slot
40 auto-injector preparatory pin
41 preparatory pin head
41 preparatory pin body
50 auto-injector spring
51 first spring end
52 second spring end
100 auto-injector device
a mid-section depth
b auto-injector injection pin longitudinal axis
c auto-injector body longitudinal axis
d auto-injector syringe plunger longitudinal axis
e auto-injector preparatory pin longitudinal axis Definitions As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a therapeutic agent," "a drug delivery composition," or "a gelator" includes mixtures of two or more such therapeutic agents, drug delivery compositions, or gelators, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

Unless stated otherwise, a weight percent (wt %) of a component is a wt/wt % value based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "subject" can be a vertebrate, such as a mammal, a fish, a bird, a reptile, or an amphibian. Thus, the term "subject" also includes domesticated animals (e.g., cats, dogs, rabbits, guinea pigs, etc.), livestock (e.g., cattle, horses, pigs, sheep, goats, horse, etc.), and laboratory animals (e.g., mouse, rabbit, rat, guinea pig, fruit fly, etc.). The term "subject" is also understood to include, as appropriate, a mammal such as a primate, and, in a further aspects, the subject is a human. The term does not denote a particular age or sex. Thus, adult and newborn subjects, as well as fetuses, whether male or female, are intended to be covered. In one aspect, the subject is a mammal. A patient refers to a subject afflicted with a disease or disorder. The term "patient" includes human and veterinary subjects. In some aspects of the disclosed methods, the subject has been diagnosed with a need for treatment of one or more oncological disorders or cancers prior to the administering step. In some aspects of the disclosed method, the subject has been diagnosed with a need for inhibition or negative modulation of STAT3 prior to the administering step. In some aspects of the disclosed method, the subject has been diagnosed with a need for treatment of one or more oncological disorders or cancers associated with STAT3 dysfunction prior to the administering step.

As used herein, the term "treatment" refers to the medical management of a patient with the intent to cure, ameliorate, stabilize, or prevent a disease, pathological condition, or disorder. This term includes active treatment, that is, treatment directed specifically toward the improvement or amelioration of a disease, pathological condition, or disorder, and also includes causal treatment, that is, treatment directed toward removal of the cause of the associated disease, pathological condition, or disorder. As used herein, and as well-understood in the art, "treatment" is an approach for obtaining beneficial or desired results, including clinical results. For purposes of the present disclosure, beneficial or desired clinical results include, but are not limited to, alleviation or amelioration of one or more symptoms, diminishment of extent of disease, stabilized (i.e., not worsening) state of disease, delay or slowing of disease progression, and/or amelioration or palliation of the disease state. "Treatment" can also mean prolonging survival as compared to expected survival if not receiving treatment.

In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In various aspects, the term covers any treatment of a subject, including a mammal (e.g., a human), and includes: (i) preventing the disease from occurring in a subject that can be predisposed to the disease but has not yet been diagnosed as having it; (ii) inhibiting the disease, i.e., arresting its development; (iii) relieving the disease, i.e., causing regression of the disease; and/or (iv) reduction in the severity of one or more symptoms associated with the disease, disorder or condition. In some aspects of the present disclosure, reduction in the severity of one or more symptoms associated with the disease, disorder or condition can refer to amelioration of one or more of the following: pain, swelling, redness or inflammation associated with an inflammatory condition or an autoimmune disease.

As used herein, the terms "effective amount" and "amount effective" refer to an amount that is sufficient to achieve the desired result or to have an effect on an undesired condition.

As used herein, the term "therapeutically effective amount" refers to an amount that is sufficient to achieve the desired therapeutic result or to have an effect on undesired symptoms, but is generally insufficient to cause adverse side effects. The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various aspects, a preparation can be administered in a "prophylactically effective amount"; that is, an amount effective for prevention of a disease or condition. A "therapeutically effective amount" as used herein, is intended to mean an amount sufficient to reduce by at least 10%, preferably at least 25%, more preferably at least 50%, and most preferably an amount that is sufficient to cause an improvement in one or more clinically significant symptoms in the patient.

The term "pharmaceutically acceptable" describes a material that is not biologically or otherwise undesirable, i.e., without causing an unacceptable level of undesirable biological effects or interacting in a deleterious manner.

As used herein, the term "derivative" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Auto-Injector Devices

Drug delivery for treatment of retinal diseases is a prevalent ophthalmic concern which has a large and growing commercial market. According to a recent report the consumer ophthalmic market was worth 24.4 billion in 2016 and is expected to increase to 34.3 billion by 2025 [Ref. 1]. Topical ophthalmic drops are the most common method of administering drugs to treat ocular disease but are subject to the transport barriers of the cornea and drainage caused by aqueous humor bulk flow. These barriers can be mitigated by drug treatment methods that allow for extended contact time with the cornea, such as topical ointments or modified contact lenses, but even with these methods, bioavailability is very low because it is still challenging to penetrate the vitreous and retina. Systemic administration of retinal drugs is not an option due to the presence of the blood-retinal-barrier (BRB), which prevents certain substances from entering the retinal tissue [Ref. 2]. A number of approaches are being studied for delivering drugs for retinal diseases including intra-ocular inserts, sub-tenon injections, iontophoresis, microneedles, and sclera implants [Ref. 3]. While each of these approaches is promising, there are problems associated with each including clinical complications, difficulty of device insertion, efficacy, costs, etc.

Because of all of these unsolved problems with the delivery approaches, intravitreal injections remain the most common method to deliver drugs to the back of the eye [Ref. 5]. The procedure is increasingly performed in office, and it is estimated to have been performed over four million times in the United states in 2013 [Ref. 6]. The placement of drug directly in the vitreous bypasses the anatomic and dynamic barriers of topical treatments, and it is therefore able to achieve the highest intraocular bioavailability [Ref. 7].

Intravitreal injections are invasive procedures which can have serious complications, such as retinal detachment or infection [Refs. 4 and 8]. The intravitreal injections are typically given once a month and typically require follow up visits about 1 or 2 weeks after the injection. Such frequent injections increase patient discomfort, while also increasing cost and possibility of a complication. Currently, monthly injections are necessary because the drugs delivered through the injection are cleared from the vitreous by multiple pathways, including flow from the vitreous to the aqueous, and uptake by the cells liming the retina followed by degradation or clearance through the flow in the choroid. The potential for side effects from injections has driven considerable research towards designing systems that can either be implanted in the eye or injected through an intravitreal injection. These drug formulations are designed to release drugs for extended periods resulting in a significant decrease in the frequency of the injections. In some cases, these formulations may be surgically placed in the eye instead of injected.

A challenge of these implantable drug release systems is that they are generally not liquid medicaments. A novel approach by Chauhan group for an extended release drug formulation includes the use of drug dispersed within an oleogel. Highly viscous, semi-solid, or solid drug formulations can be difficult to administer due to the amount of force required to push the medicament out of the syringe. Syringeability, also known as injectability, refers to this force required to inject a given solution at a chosen rate, needle length, and gauge. Flow through the needle is characterized by the Hagen-Poiseuille equation:

$$\Delta P = \frac{8\mu L Q}{\pi R^4} \quad \text{(Equation 1)}$$

where $\Delta P$ is the pressure difference across the needle, $\mu$ is the dynamic viscosity, Q is the volumetric flowrate, and R is the needle radius. The syringeability is encompassed in the $\Delta P$ pressure difference term. The Hagen-Poiseuille equation is valid only for Newtonian fluids. Because the formulations of interest are commonly non-Newtonian, the Poiseuille equation must be modified or new models must be used to account for the shear thinning or dilatant behavior exhibited during an injection [9]. Injectability has been previously evaluated for different viscosity formulations. It was found that injections that require more than 125 mPa force may be very difficult, and as force required increases, the injection may become impossible [Refs. 10-11].

Auto-injectors, or medical devices designed to deliver a dose of drug without manually pushing a plunger down, can be used to perform injections of high viscosity formulations. These are commonly spring-loaded syringes. Instead of manual force supplied by the user onto a syringe plunger, the device uses a coiled spring which exerts force on the plunger when released. These devices are advantageous for use with high viscosity solutions due to their ability to apply much more force than a human thumb [Ref. 12]. The stiffness of the spring and displacement can be adjusted as needed to match the force required to inject the medicament.

Due to the recent increased interest in auto-injectors, the market is expanding. Roots Analysis, a biopharmaceutical market research firm, predicts the market to grow at a rate of 8% per year for the next 10 years. According to Mordor Intelligence, the market was valued at 40.5 billion USD in 2016 [Ref. 13].

Spring loaded auto-injector devices have been used for delivering drug to a target area. Injectors can be found on the market that use a variety of different mechanisms such as pen-style, trigger activated, twist and depress, and more [Ref. 13]. Conventional devices include the pressure activated epinephrine injector EpiPen®, the button activated epinephrine injector AnaPen®, or interferon injectors such as the Avonex Pen®.

The EpiPen® is a handheld device used for delivering epinephrine intramuscularly for emergency treatment of anaphylactic reaction [Ref. 14]. The injector contains a spring-loaded needle which extends from the device and penetrates into the vastus lateralis muscle when the device is triggered. The device is sold with a preloaded amount of epinephrine in sterile solution [Ref. 15]. The device becomes activated when pressed against the patient's thigh. Pushing the device against the thigh starts a sequence of events which rearwardly moves the container with the medicament, engages the inner body, and releasing the spring. The spring in the housing of the device provides the force to drive the medicament through the needle tip and into the body [Ref. 15].

Figure 2:
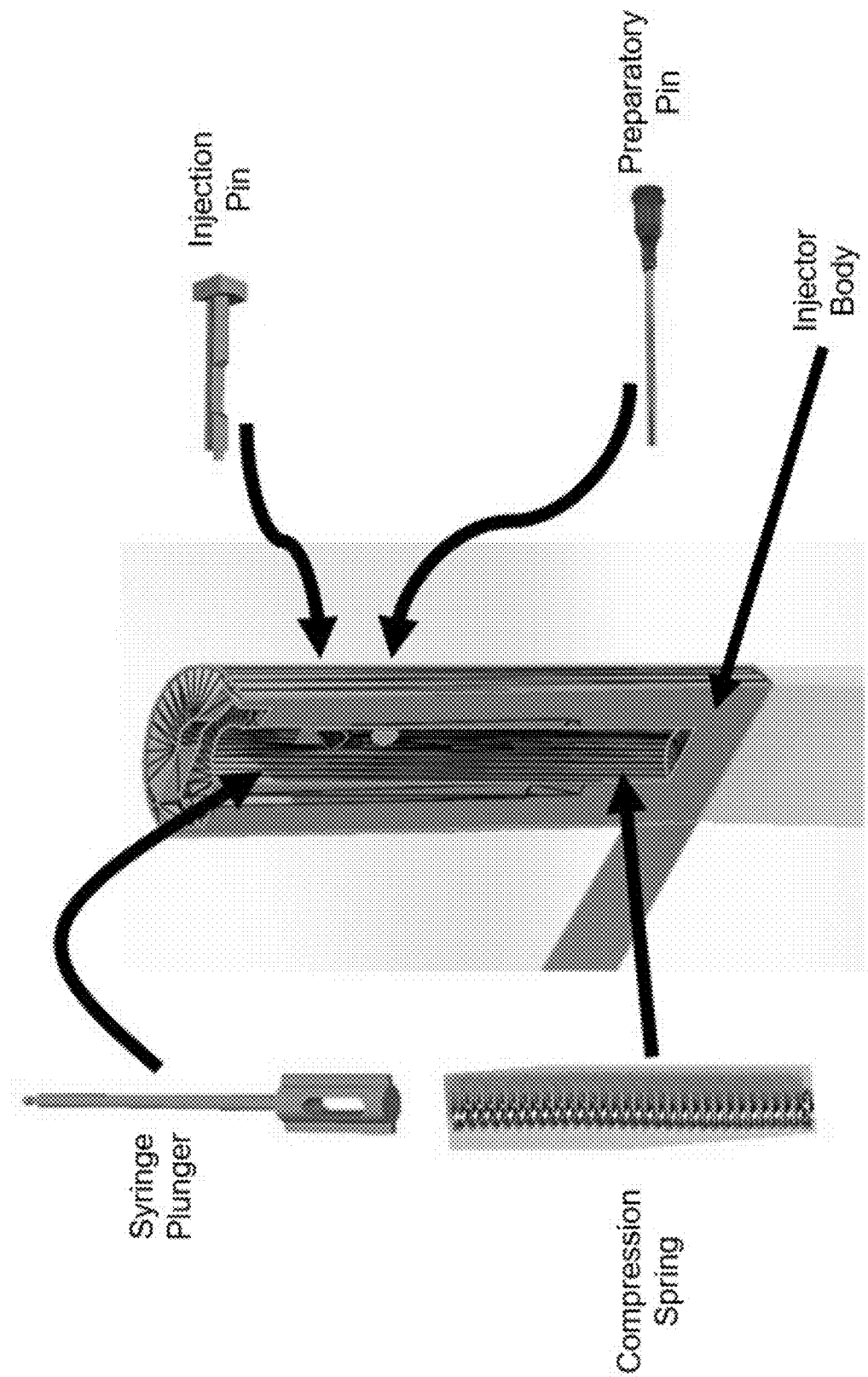
FIG. 2 is a cross-sectional schematic view of representative components of a disclosed auto-injector device. The representative components, as labeled and shown in the photographic image are: auto-injector injection pin; auto-injector body; auto-injector compression spring; auto-injector syringe plunger; and auto-injector preparatory pin.
Figure 3:
FIG. 3 is a photographic image of a representative of a disclosed auto-injector device fitted with a syringe and hypodermic needle.

Auto-injectors use for delivery of ophthalmic drugs remains largely poorly investigated. One conventionally available device is being developed by Clearside Biomedical Inc. This device was designed for suprachoroidal injections using a 30-gauge needle. The exposed needle tip is 1 mm in length. FIGS. 2 and 3 show the Clearside Biomedicals injector device [Ref. 16]. The Clearside Biomedical's microinjector device can be used to administer triamcinolone acetonide to the suprachoroidal space for the treatment of uveitis. The device is designed to only administer drug to the target area. This is achieved by a spring which only has the force to release medicament into an area with a density lower than a certain threshold determined by the parameters of the injection (needle size, viscosity of medicament). Because each layer of the eye has different densities, the force required to release drug into each layer is variable. With this device, the medicament can only be administered in the suprachoroidal space, which has a lower density than the sclera. The device is activated by pushing a button on the outside of the assembly. Activation releases the spring, which has the force to move a plunger into a medicament container. The plunger pushes the medicament out of the needle and in to the target area of the eye [17].

A further conventional device was developed by Allergan for intravitreal injection of OZURDEX® implant. The conventional Allergan device contains a folded spring that is packaged in the compressed state. The OZURDEX® implant is stored within the needle chamber. When the injection is triggered, the spring decompresses, creating the force necessary to move the plunger from an initial position to a final position. As the plunger is pushed to its final position, the OZURDEX® implant which is housed in the needle tip gets expelled from the device into the eye [18]. The linkage inside of the injector serves the same purpose as a compression spring from a traditional auto injector. In the unactuated state, the linkage stores energy, which is then released upon activation to provide the force required to push the plunger. The plunger in device extends into the needle tip, where it can expunge the implant during the injection procedure. The needle is 22-gauge, which means after the injection the wound is considered self-sealing. Self-sealing in this sense describes a wound which requires no sutures and only has minimal leakage of fluid upon removal of the injector [Ref. 18].

In order to inject highly viscous formulations, e.g., oleogel formulations, that are receiving increasing attention in the ophthalmological clinical area, a syringe loaded auto injector is required. The desired formulations are gels or other viscous materials that can be injected quasisolid or semisolid. In these types of formulations, it is very common for pockets of air to get trapped in the syringe body. This phenomenon is unacceptable for intravitreal injections for two reasons. Trapped air causes voids in the syringe, which can lead to inaccurate dosing of medicament. Also, when air is expunged into the eye, it can lead to severe complications such as retinal detachment or acute intraocular hypertension. The disclosed auto-injector device is specifically designed for dosing an extended release formulations that are highly viscous, e.g., oleogel formulations, while also preventing trapped air pockets in such formulations.

The disclosed auto-injector device comprises: injector body, syringe plunger, compression spring, preparatory pin, and injection pin. The auto-injector can be a two stage auto injector device. In the examples below, a prototype device was fabricated using SolidWorks computer-aided design and printed using a 3D printer. Representative prototype parts are shown in FIG. 1. In various aspects, the spring and injection pin can be changed to allow for customization of the auto-injector. In the disclosed auto-injector device, as shown in FIG. 2, the injector body acts as a housing which contains all of the other parts of the injector. The disclosed auto-injector device can be used with a standard syringe body and needle.

To assemble the device, the spring can first be compressed inside the injector body such that syringe plunger can be locked into place by the preparatory pin. The preparatory pin can be inserted through a hole in the injector body, and then goes through the hole on the syringe plunger, and then through the injector body hole on the other side. This pin, when locked into place, prevents the compressed spring from moving the syringe plunger. Once the syringe plunger is in place, the injection pin is then also inserted through the appropriate hole in the injector body. The hole is specifically shaped such that the injector pin fits snug into the injector body and the syringe plunger. A syringe loaded with gel can be attached over the syringe plunger and twist locked into place on the injector body. After assembly, the auto-injector will not activate unless an operator pulls the appropriate pins. FIG. 7 shows a picture of the fully assembled auto-injector device with a syringe and needle attached.

The disclosed auto-injector device is designed as a two-step injection system. The first step is initiated by pulling and removing the preparatory pin. In the first step, air and excess gel is pushed out of the needle, as the plunger packs the gel to the bottom of the syringe. After material has stopped releasing through the needle, the first phase is over. The first step is intended to be done as a preparatory procedure immediately before intravitreal injection. The second step is initiated by the operator by pushing the injection pin into the injector body such that the spring moves into its final resting place. The second step releases the remaining packed gel. Because the auto-injector is prepped by the first stage, the intravitreal injection stage can release specific amounts of gel, which can be set by the device. The injection phase has been designed such that the device can be operated with one hand.

Figure 9:
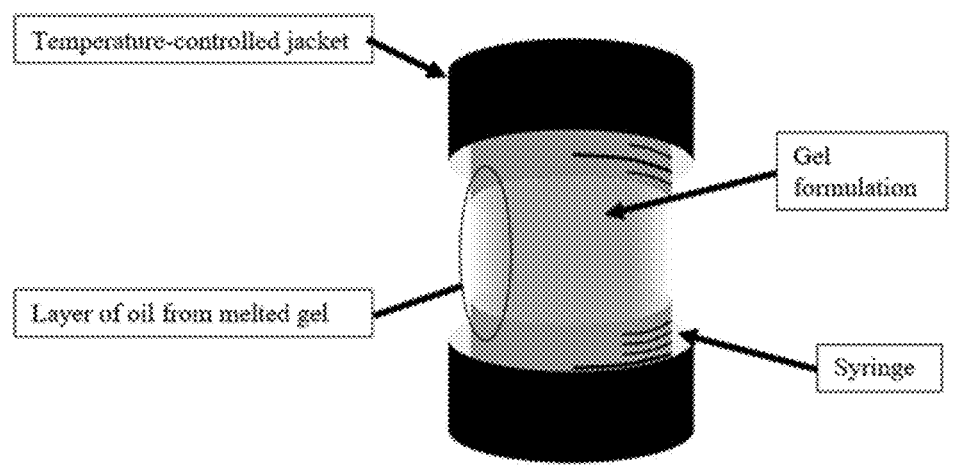
FIG. 9 shows a representative schematic drawing of a component for a disclosed auto-injector device for providing a syringe equipped with temperature-controlled jacket. In the drawing, a cutaway view of the gel is shown to highlight melting of the gel formulation. The jacket completely envelops the syringe, and accordingly, the gel can melt axisymmetrically.

One aspect of the disclosed auto-injector device that sets it apart from other auto-injectors is the two-step system of injection that provides successful intravitreal injection of a gel or any other highly viscous liquid. Unlike most liquid intravitreal injections, where the medicament can be drawn into the syringe and then immediately administered; viscous formulations or semisolids, such as the oleogel formulations, often require prepping. Without a prepping procedure, inconsistent doses may be administered, as well increased intraocular pressure due to the accidental injection of excess air from the syringe. To mitigate this issue, the two-step injection procedure disclosed herein was developed. The preparatory phase can be completed completely outside of the patient in only a few minutes. The volume of gel administered in the injection phase is determined only by the preset displacement of the spring, and not by the force the doctor exerts on the device. This means a clinical provider performing the injection can operate the disclosed auto-injector device in the injection step with one hand while monitoring the patient and the injection procedure. The injection pin is a customizable part of the auto-injector. The size of the injector pin is defined by the height of the pin in the midsection. The midsection is accessed when the injector pin is pushed into the injector body to initiate the injection phase. FIG. 9 shows a diagram of the injector pin. The displacement of the spring and as a result, volume of the injection, is set by the size of the injector pin.

Due to the viscosity of the gel, a strong force must be applied in order to push the plunger and force the formulation out. The force required for injection of a particular formulation can be modulated and attenuated by using springs of different force. Unfortunately, springs that are excessively strong can be difficult to compress and lock into place with the preparatory pin. Additionally, these springs can cause the needle to shake briefly when the injection pin is pulled. To mitigate these detrimental effects, the system may be adjusted to reduce the force required to inject. As previously discussed, flow of fluid through the auto-injector needle can be characterized by the Hagen-Poiseuille equation. By measuring the total time for a known volume of gel to release from the needle, volumetric flow rate can be determined. This value can be used to compare injections from the OleoJect after different system modifications.

In a further aspect, the friction between the gel and the needle or syringe walls will be reduced by the addition of a lubricious layer. This will allow the gel to slide out of the needle tip with less obstruction. In this system, the syringe can be split into different compartments, containing different formulations. The first compartment will contain the material which will be used in the lubricious layer. The second compartment will contain the drug formulation. In the preparatory phase, the first compartment material is released. This material is released outside of the eye. Although the first compartment will then be emptied, some traces of the material will remain on the walls of the syringe and the needle, effectively coating it with a lubricious material. In the injection phase, the second compartment will be released, and the gel will easily slide against the coating of lubricious material. The key to this design is the two-phase nature of the auto-injector. The lubricious material from the first compartment cannot be directly injected into the eye because of possible toxicity effects. When the second compartment is released, only a thin coating of lubricious material comes out with the gel, reducing the toxic effects. Potential lubricious film materials include solutions of polyethylene glycol (PEG) or polyvinylpyrrolidone (PVP), polymers that already have extensive use in the pharmaceutical industry [20][21]. This design can also be expanded to include multiple compartments, with multiple materials. Multiple injection stages can be added by modifying the auto-injector to include more than two pins.

The reference numbers in Table 1 are used herein throughout, and are show in exemplary aspects in FIGS. 10A-15.

TABLE 1

| Ref. Number | Description |
| --- | --- |
| 10 | Injection pin |
| 14 | Injection pin midsection |
| 15 | Injection pin outer section |
| 16 | Injection pin head |
| 17 | Injection pin body |
| 20 | Syringe plunger |
| 21 | Syringe plunger pin slot |
| 22 | Syringe plunger pin body |
| 23 | Syringe plunger body |
| 24 | Syringe plunger first guide |
| 25 | Syringe plunger second guide |
| 30 | Injector body |
| 31 | Injector body syringe cavity |
| 32 | Injector body open end |
| 33 | Injector body closed end |
| 34 | Injector body first preparatory pin opening |
| 35 | Injector body second preparatory pin opening |
| 36 | Injector body first injection pin opening |
| 37 | Injector body second injection pin opening |
| 38 | Injector body first syringe guide slot |
| 39 | Injector body second syringe guide slot |
| 40 | Preparatory pin |
| 41 | Preparatory pin body |
| 42 | Preparatory pin head |

TABLE 1-continued

| Ref. Number | Description |
| --- | --- |
| 50 | Auto-injector spring |
| 51 | Auto-injector spring distal end |
| 52 | Auto-injector spring proximate end |
| 100 | Auto-injector device |
| a | Injection pin delivery depth |
| b | Injection pin longitudinal axis |
| c | Injector body longitudinal axis |
| d | Syringe plunger longitudinal axis |
| e | Preparatory pin longitudinal axis |
| f | Injection pin mid-section width |
| g | Injection pin outer section width |

Figure 10A:
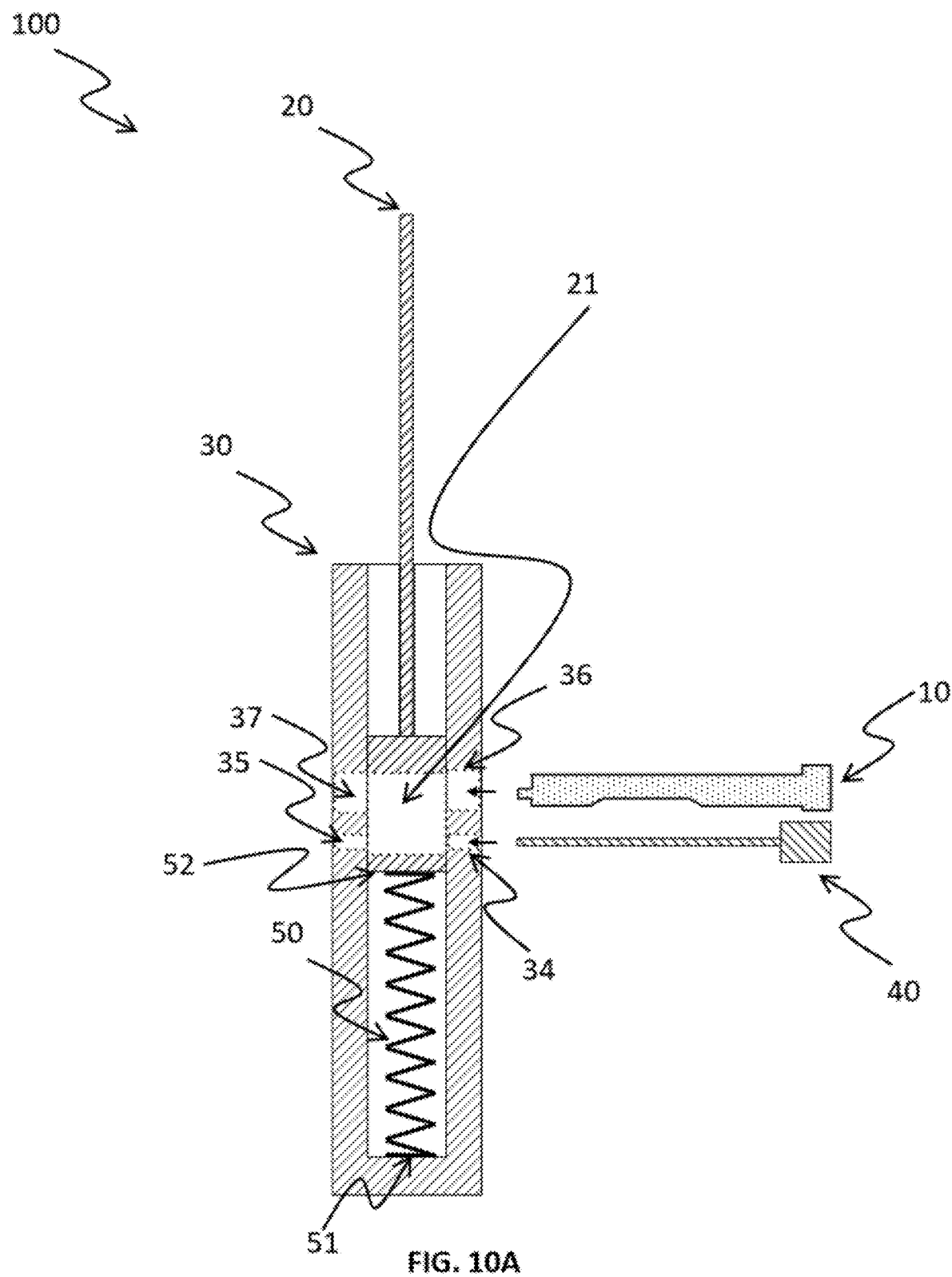
FIGS. 10A-10D show representative cross-sectional plan views of a representative disclosed auto-injector device along a longitudinal axis of the device. The different figures show various stages of component engagement and actuation.
Figure 10B:
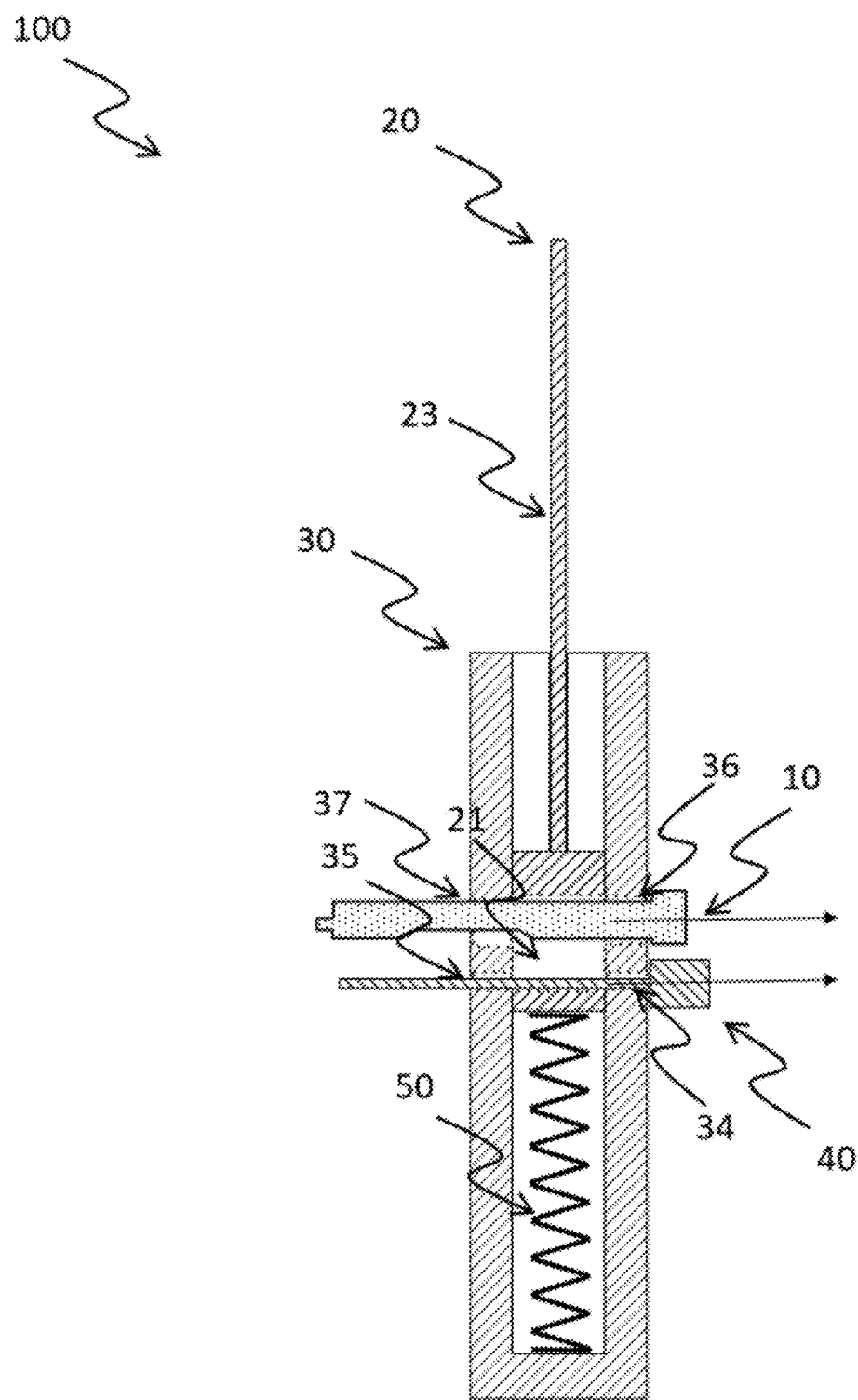
Figure 10C:
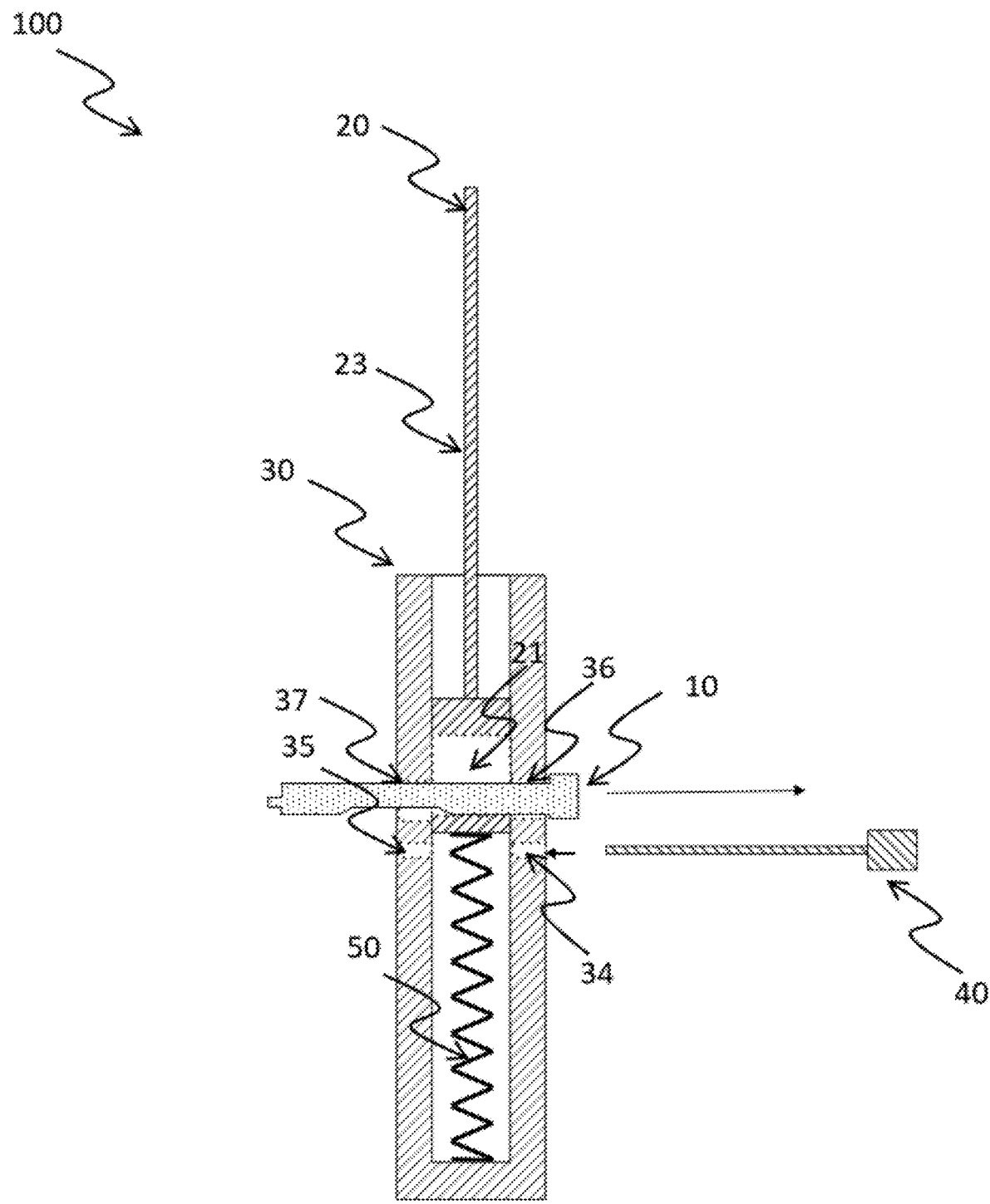
Figure 10D:
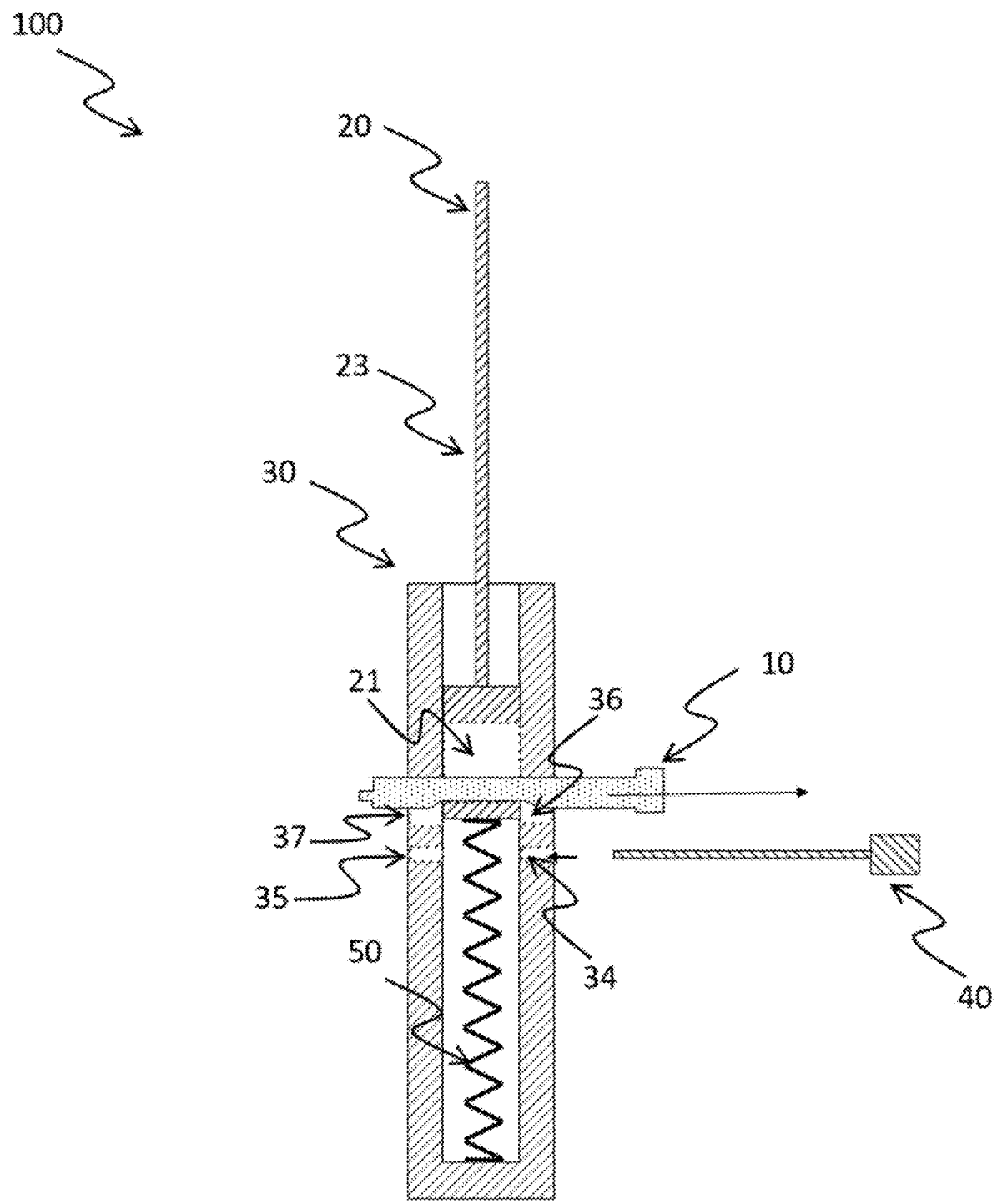

Referring now to FIGS. 10A-10E, which show representative cross-sectional plan views of a representative disclosed auto-injector device along a longitudinal axis of the device. The different figures show various stages of component engagement and actuation. FIG. 10A shows a cross-sectional view of a representative disclosed auto-injector body, auto-injector injection pin, auto-injector syringe plunger, auto-injector preparatory pin, and auto-injector spring; in which the auto-injector preparatory pin and auto-injector injection pin are outside the auto-injector body and unengaged. FIG. 10B shows a cross-sectional view of a representative disclosed auto-injector body, auto-injector injection pin, auto-injector syringe plunger, auto-injector preparatory pin, and auto-injector spring; in which the auto-injector preparatory pin and auto-injector injection pin are fully inserted into the body. FIG. 10C shows a cross-sectional view of a representative disclosed auto-injector body, auto-injector injection pin, auto-injector syringe plunger, auto-injector preparatory pin, and auto-injector spring; in which the auto-injector preparatory pin has been removed, but with the auto-injector injection pin fully inserted into the body. FIG. 10D shows a cross-sectional view of a representative disclosed auto-injector body, auto-injector injection pin, auto-injector syringe plunger, auto-injector preparatory pin, and auto-injector spring; in which the auto-injector preparatory pin has been removed, and with the auto-injector injection pin is positioned in the actuated position, thereby allowing further movement of the auto-injector syringe plunger in the direction of the body opening versus the position of the plunger shown in FIG. 10C, when the injection pin is in the non-actuated position. For purposes of illustrating certain aspects, FIGS. 10A-10D do not depict a syringe with needle engaged with the syringe plunger.

Figure 11A:
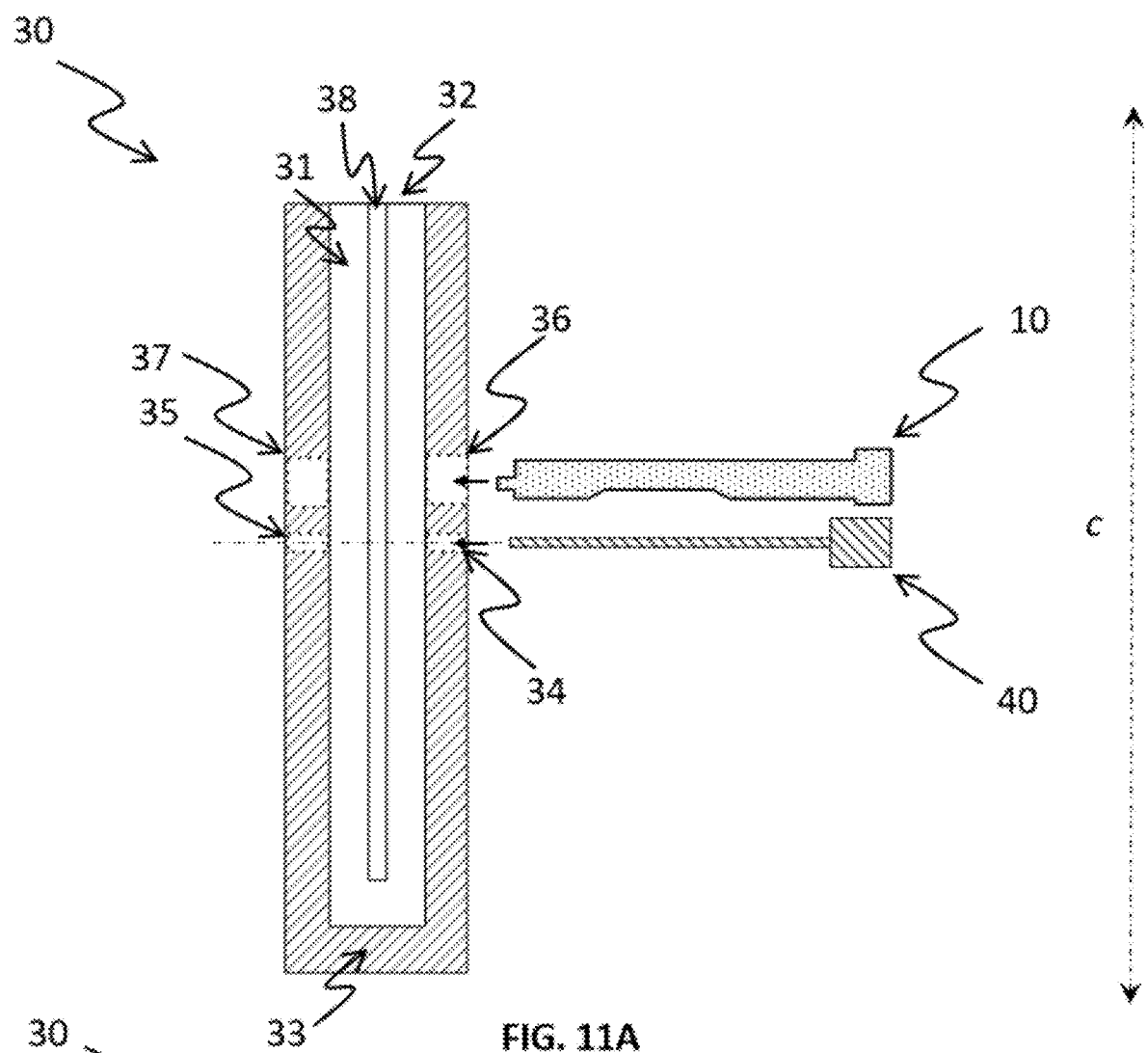
FIGS. 11A-11D show cross-sectional views of a representative disclosed auto-injector body with auto-injector preparatory and injection pins.
Figure 11B:
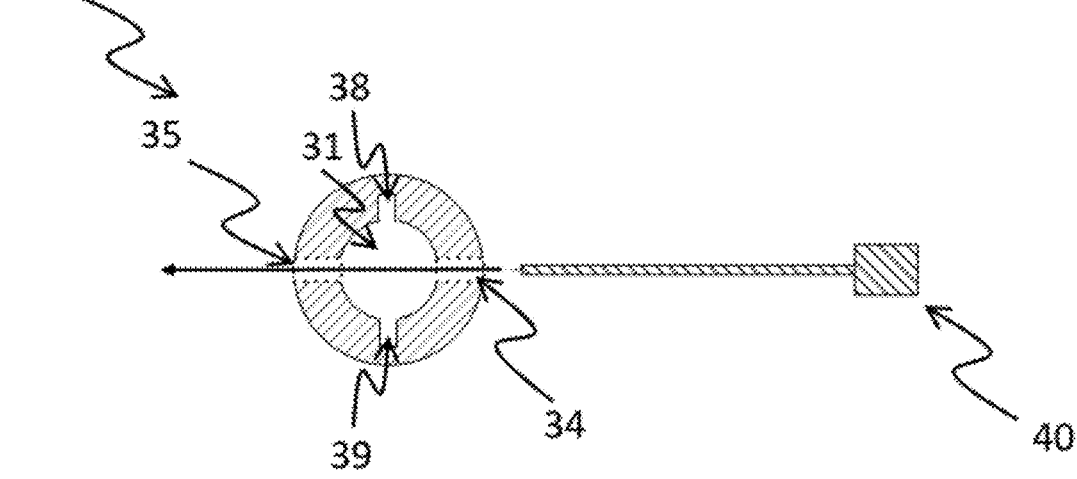
Figure 11C:
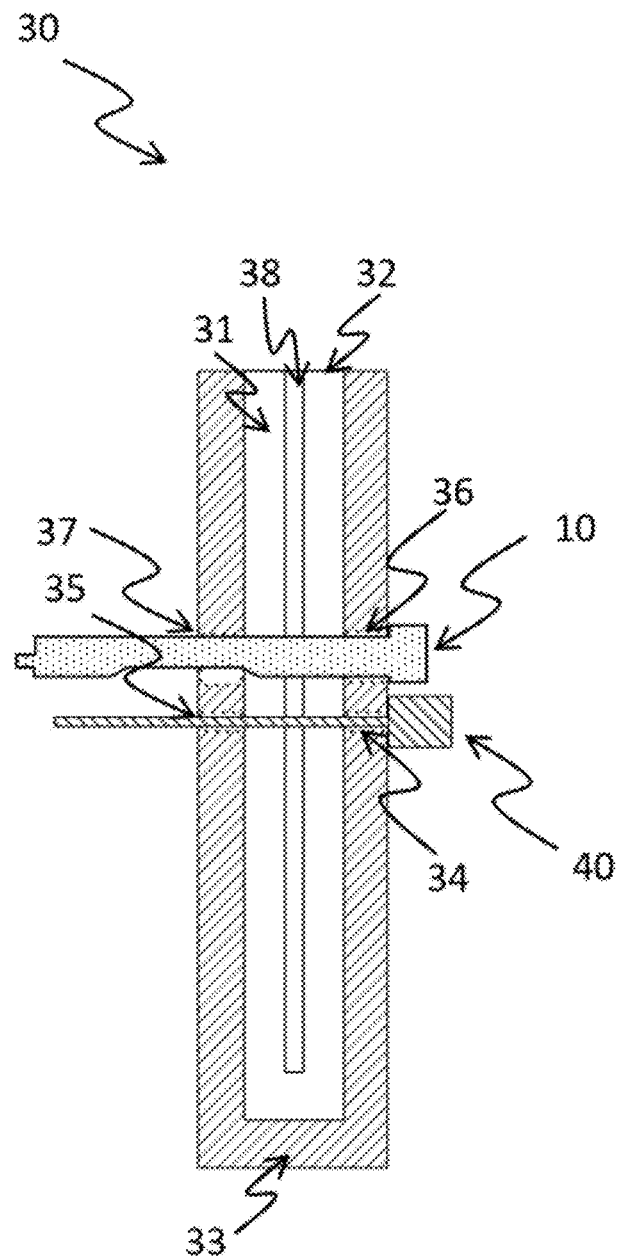
Figure 11D:
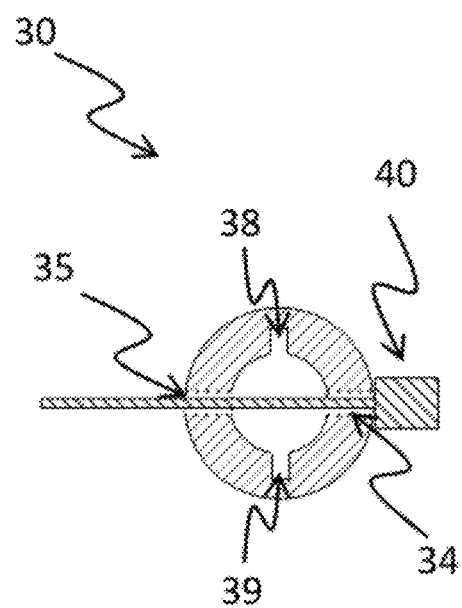

Referring now to FIGS. 11A-11D, which show cross-sectional views of a representative disclosed auto-injector body with auto-injector preparatory and injection pins. FIG. 11A shows a cross-sectional plan view of a representative disclosed auto-injector body along the longitudinal axis with the auto-injector preparatory and injection pins shown not inserted into the body. FIG. 11B shows a cross-sectional view a representative disclosed auto-injector body along the plane of the dotted line shown through the auto-injector preparatory pin openings shown in FIG. 11A. In FIG. 11B, the auto-injector preparatory and injection pins are shown not inserted into the body. FIG. 11C shows a cross-sectional plan view of a representative disclosed auto-injector body along the longitudinal axis with the auto-injector preparatory and injection pins shown fully inserted into the body. FIG. 11D shows a cross-sectional view a representative disclosed auto-injector body along the plane of the dotted line shown through the auto-injector preparatory pin openings shown in FIG. 11C. In FIG. 11C, the auto-injector preparatory and injection pins are shown fully inserted into the body.

Figure 12:
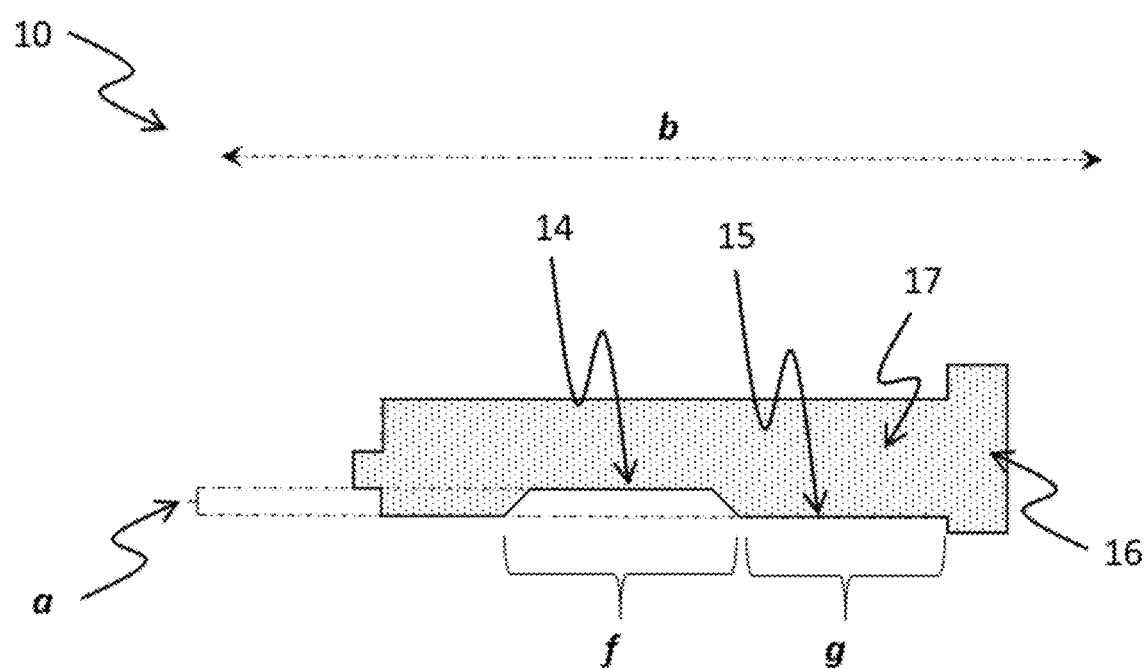
FIG. 12 shows a cross-sectional plan of a representative disclosed auto-injector injection pin the long axis of the injection pin.

Referring now to FIG. 12, which shows a cross-sectional plan of a representative disclosed auto-injector injection pin the long axis of the injection pin.

Referring now to FIGS. 13A-13D, which show cross-sectional views of a representative disclosed auto-injector syringe plunger. FIG. 13A shows a cross-sectional view of a representative disclosed auto-injector syringe body along the longitudinal axis. FIG. 13B shows a cross-sectional view a representative disclosed auto-injector body along the plane of the dotted line shown through the syringe plunger pin slot in FIG. 13A. FIG. 13C shows a cross-sectional view of a representative disclosed auto-injector syringe body along the longitudinal axis, but from an orientation that is 90° to the view in FIG. 13A. FIG. 13D shows a cross-sectional view a representative disclosed auto-injector body along the plane of the dotted line shown through the syringe plunger pin slot in FIG. 13C.

Referring now to FIGS. 14A-14B, which show cross-sectional views of a representative disclosed auto-injector body. FIG. 14A shows a cross-sectional plan view of a representative disclosed auto-injector body along the longitudinal axis. FIG. 14B shows a cross-sectional view a representative disclosed auto-injector body along the plane of the dotted line shown through the auto-injector preparatory pin openings shown in FIG. 14A.

Figure 15:
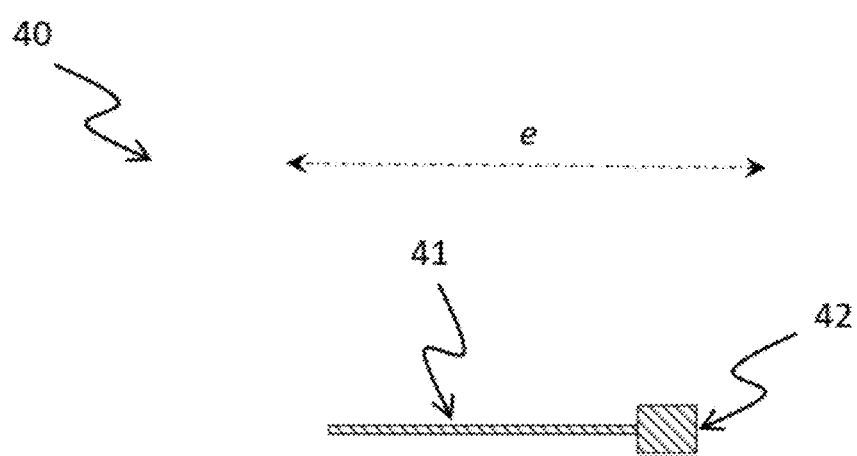
FIG. 15 shows a cross-sectional plan view of a representative disclosed auto-injector preparatory pin.

Referring now to FIG. 15, which shows a cross-sectional plan view of a representative disclosed auto-injector preparatory pin.

Drug Delivery Compositions

In one aspect, the disclosure relates to the use of the disclosed auto-injector devices using a drug delivery composition comprising an oleogel composition, a viscous drug delivery composition, and/or semi-solid or quasi-solid drug delivery composition. In a further aspect, a disclosed oleogel composition further comprises one or more therapeutic agents. The disclosed oleogel compositions are relatively cheap and easy to prepare, offer stability to emulsions and other liquid based drug systems, can be thermoreversible, can be resistant to microbial contaminates, and can be formulated with both hydrophilic and hydrophobic drugs. The disclosed oleogel compositions controlled release of ophthalmic formulations, both for the front and the back of the eye. In some aspects, the disclosed oleogel compositions can be used for delivery of a therapeutic agent to the back eye via injection of a drug-loaded composition into the vitreous. The disclosed oleogel compositions can retain a given shape or geometry, such as a cylindrical or spherical geometry, after injection into the vitreous. In some aspects, the disclosed oleogel compositions have a high viscosity. In some instances, the high viscosity of the oleogel facilitates maintenance of the initial shape or geometry following injection. In a further aspect, the slow dissolution of an oil in the oleogel will eventually lead to degradation of the injected oleogel composition.

In an aspect, the disclosed drug delivery compositions are an oleogel comprising an oil phase and a gelator. The term "oleogel" herein refers to a gel having a continuous oil phase having a gelator uniformly dispersed in the gel phase and functioning as the gelling agent. The oleogels are suitably clear and translucent, generally transparent materials having the physical properties of a true gel. The oleogels optionally comprise a surfactant, which when present is likewise homogeneously distributed through the oleogel. Thus, the surfactant is not concentrated at the surface of oil or water micelles as in an emulsion. The oleogel may consist essentially of one or more oils or fats, the gelator, and optionally, the surfactant. The oleogel composition has characteristics of a gel. The term "gel" herein is used in its usual sense of a material having a continuous structure with macroscopic dimensions that is permanent on the time scale of an analytical experiment and is solid-like in its rheological properties. Gels bounce rather than flow, and exhibit substantially linear viscoelastic characteristics, at stresses below their yield stress. Gels have a melting point. Gels are conveniently defined by their rheological properties, in particular their yield stress and the ratio of their elastic modulus to their viscous modulus (G'/G") as measured at 20° C. and 1 Hz in a conventional viscoelastic analyzer as described below. Gel-like behaviour is characterized by G'/G" greater than about 1 under these conditions.

In a further aspect, a disclosed oleogel comprises an oil phase comprising one or more oils; and a gelator. In a still further aspect, a disclosed oleogel comprises an oil phase comprising one or more oils; and a gelator; wherein the oil phase is present in an amount of about 10 wt % to about 30 wt %; wherein the gelator is present in an amount of about 5 wt % to about 20 wt %; and wherein the wt % values are based on the weight of the one or more oils and of the gelator.

In a further aspect, a disclosed oleogel comprises one or more oils present in an amount, based on the weight of the one or more oils and of the gelator, of about 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %; a range encompassed by any of the foregoing values; or a set of any of the foregoing values.

In a further aspect, a disclosed oleogel comprises soybean oil present in an amount, based on the weight of the one or more oils and of the gelator, of about 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %; a range encompassed by any of the foregoing values; or a set of any of the foregoing values.

In a further aspect, a disclosed oleogel comprises a gelator present in an amount, based on the weight of the one or more oils and of the gelator, of about 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %; a range encompassed by any of the foregoing values; or a set of any of the foregoing values.

In a further aspect, a disclosed oleogel comprises ethyl cellulose as the gelator, and wherein the ethyl cellulose is present in an amount, based on the weight of the one or more oils and of the gelator, of about 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %; a range encompassed by any of the foregoing values; or a set of any of the foregoing values.

In a further aspect, a disclosed oleogel further comprises octanoic acid, wherein the octanoic acid is present in an amount of from about 10 wt % to about 30 wt % based on the weight of the one or more oils, the gelator, and the octanoic acid. In a still further aspect, a disclosed oleogel further comprises octanoic acid, wherein the octanoic acid is present in an amount, based on the weight of the one or more oils, the gelator, and the octanoic acid, of about 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %; a range encompassed by any of the foregoing values; or a set of any of the foregoing values.

In a further aspect, the oil phase comprises a triacylglycerol oil. In a still further aspect, oil phase comprises a mono-, di-, and triglycerides of synthetic, semisynthetic and natural origin, and mixtures thereof.

In a further aspect, the oil phase comprises an oil such as soybean oil, castor oil coconut oil, canola oil, corn oil, cottonseed oil, flaxseed oil, olive oil, palm oil, rapeseed oil, rice bran oil, saffron oil, sesame oil, sunflower oil, peanut oil, almond oil, linseed oil, hazelnut oil, poppy seed oil, mustard seed oil, avocado oil, cashew nut oil, cocoa butter, grapeseed oil, shea butter, and combinations thereof. In a further aspect, the oil phase comprises a synthetic oil such as a silicone oil. The foreogoing are plant-derived oils. In a yet further aspect, the oil phase comprises an animal derived oil such as a fish oil, including, but not limited to, salmon oil, halibut oil, and combinations thereof, or in combination with one or more of the disclosed plant-derived oils.

In a further aspect, the gelator comprises a non-lipid based components such as ethyl cellulose, candelilla wax, chitin, and colloidal silicon dioxide, saturated fatty acid chains such as kokum fat, trilaurin, trimyristin, tripalmitin, tristearin, dodecanoic acid, tetradecanoic acid, hexadecanoic acid, octadecanoic acid, 12-hydroxyoctadecanoic acid, 12-methyloctadecanoic acid, adipic acid, suberic acid, sebacic acid, and hexacosanoic acid, saturated wax esters including but not limited to stearoyl behenate, and combinations of the foregoing. In a still further aspect, the gelator component comprises a combination of components, such as stearic acid and stearyl alcohol, lecithin and sorbitan tristearate, and β-sitosterol and γ-oryzanol. In a still further aspect, the gelator is ethyl cellulose.

In a further aspect, the gelator comprises beeswax, sunflower wax, a gamma oryzanol+beta sitosterol mixture, a sorbital+lechtin mixture, sorbitan monostearate, and combinations thereof.

In a further aspect, the gelator comprises one or more peptide, polypeptide or protein. In a yet further aspect, the gelator comprises one or more peptide. In a yet further aspect, the gelator comprises one or more polypeptide. In an even further aspect, the gelator comprises one or more protein.

In a further aspect, the oil phase comprises of an oil or a mixture of oils with melting point higher than the temperature in the vitreous humor. In some case, an oil phase comprising an oil or a mixture of oils with melting point higher than the temperature in vitreous humor may not require a gelator in order to retain the cylindrical structure of the drug delivery composition following administration. In some aspects, an oil phase comprising an oil or a mixture of oils with melting point higher than the temperature in the vitreous humor does not comprise a gelator. In an alternative aspect, an oil phase comprising an oil or a mixture of oils with melting point higher than the temperature in the vitreous humor comprises a gelator.

Exemplary ethylcelluloses that can be used in the process of the present invention include ETHOCEL™ Std. 4, ETHOCEL™ Std. 7, ETHOCEL™ Std. 10, ETHOCEL™ Std. 14, ETHOCEL™ Std. 20, and ETHOCEL™ Std. 45 (which are all commercially available from Dow Chemical Company, Midland, Michigan). Combinations of the exemplary ethylcelluloses can also be used. The level of gelling provided by the ethylcellulose in the oleogel is a function of the proportion of ethylcellulose employed as well as the grade of the ethylcellulose, as is known to those skilled in the art.

Although a surfactant is not necessary to prepare the disclosed oleogels, it can be optionally added in certain aspects to modify the properties of the oleogel, such as to increase its firmness and/or alter dissolution rates, and/or stabilize the water drops in the oleogel. Examples of surfactant that can be used in the disclosed oleogels are pharmaceutically acceptable surfactants and emulsifiers such as polyoxyethylene sorbitan monooleate (Tween 80 or Polysorbate 80); polyoxyethylene sorbitan tristearate (Tween 65 or Polysorbate 65); polyoxyethylene sorbitan monostearate (Tween 60 or Polysorbate 60); sorbitan monooleate (SMO or Span 80); sorbitan monostearate (SMS or Span 60); glyceryl monooleate (GMO); glyceryl monostearate (GMS); glyceryl monopalmitate (GMP); polyglycerol esters such as polyglyceryl ester of lauric acid-polyglyceryl polylaurate (PGPL), polyglyceryl ester of stearic acid-polyglyeryl polystearate (PGPS), polyglyceryl ester of oleic acid-polyglyceryl polyoleate (PGPO) and polyglyceryl ester of ricinoleic acid-polyglyceryl polyricinoleate (PGPR); diglycerides; monoglycerides, such as succinylated monoglyceride, lactylated monoglyceride, acetylated monoglyceride, monoglyceride citrate, monoglyceride phosphate, stearyl monoglyceride citrate, and diacetyl-tartrate ester of monoglyceride; calcium stearoyl lactylate; sodium stearoyl lactylate; sucrose esters; lecithin; and triethyl citrate. In some aspecgts, the disclosed oleogel does not contain any emulsifier or surfactant, i.e., no emulsifier or surfactant is added during preparation.

In various aspects, an optional surfactant or emulsifier can be an anionic surfactants including, but not limited to, sodium and potassium salts of straight-chain fatty acids, polyoxyethylenated fatty alcohol carboxylates, linear alkyl benzene sulfonates, alpha olefin sulfonates, sulfonated fatty acid methyl ester, arylalkanesulfonates, sulfosuccinate esters, alkyldiphenylether(di)sulfonates, alkylnaphthalenesulfonates, isoethionates, alkylether sulfates, sulfonated oils, fatty acid monoethanolamide sulfates, polyoxyethylene fatty acid monoethanolamide sulfates, aliphatic phosphate esters, nonylphenolphosphate esters, sarcosinates, fluorinated anionics, anionic surfactants derived from oleochemicals, and combinations of any thereof.

In various aspects, an optional surfactant or emulsifier can be an non-anionic surfactants including, but not limited to, sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl) ether, polyoxyethylene monostearate, polyoxyethylene monooctadecyl ether, polyoxyethylene dioleate, polyoxyethylene distearate, polyoxyethylene sorbitan monolaurate polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, sorbitol hexaesters, ethoxylated castor oil, ethoxylated soybean oil, rapeseed oil ethoxylate, ethoxylated fatty acids, ethoxylated fatty alcohols, ethoxylated polyoxyethylene sorbitol tetraoleate, glycerol and polyethylene glycol mixed esters, alcohols, polyglycerol esters, monoglycerides, sucrose esters, alkyl polyglycosides, polysorbates, fatty alkanolamides, polyglycol ethers, derivatives of any thereof, and combinations of any thereof.

In some aspects, the disclosed drug delivery composition is formulated with a first therapeutic agent and a second therapeutic agent, wherein each of the first therapeutic agent and second therapeutic agent are independently selected from a comprise multiple therapeutic agents that can target different aspects of a single clinical condition and/or multiple therapeutic agents that each target a distinct clinical condition. In a further aspect, the second drug ameliorates a side effect or othe deleterious effect of the first drug. For example, a glaucoma drug could be included to eliminate an intraocular pressure increase that can follow an intravitreal injection.

In various aspects, the oil phase can be a drug or a nutraceutical such as vitamin E. In a further aspect, the oil phase contains a plurality of oil types. In a still further aspect, the oil phase comprises a first oil and a second oil, wherein each oil is independently selected from a disclosed oil. For example, a first oil can be selected to minimize the solubility of a given drug in the oil mixture such that the given drug is present as particles, and the second oil chosen to improve the gelling properties of the composition.

In various aspects, a disclosed drug delivery composition, i.e., an oleogel, is at an elevated temperature, then cooled to a suitable temperature sufficient to mitigate or avoid degradation of the therapeutic agent that is added, but still sufficiently elevated to allow good mixing of the drug particles. In another aspect, the oleogel prepared drug is allowed to cool and then, in a second step, is melted just above a melting temperature of the oleogel to allow incorporation of a therapeutic agent. In a still further asepct, the oil phase and gelator are selected to achieve a melting point slightly above the physiological temperature.

In some aspects, the oil in the oil phase has a limited solubility in vitreous humor. In a further aspect, the solubility of an oil in the vitreous humor is attenuated in order to provide modulate time durations for a drug delivery composition in the vitreous. Alternatively, the residence time or duration in the vitreous humor can be modulated by varying the concentration of gelator and/or drug concentration.

The drug loading levels achieved in the example described herein below for dexamethasone are comparable to that for currently commercialized drug delivery compositions for retinal delivery. The data suggest that the solubility limit of a drug in the oil phase is an important parameter in the overall kinetics of drug release from the disclosed drug delivery compositions. Accordingly, choice of a specific oil in a disclosed drug delivery composition can be used to modulate the rate of drug release and the period of extend release. In some aspects, if an oil with low solubility is not a good choice for gelation, then a mixture of oils can be used wherein a first oil can be chosen based on solubility criterion associated with the particular drug desired for the composition and a second oil chosen to maximize gelation of the drug delivery composition. The choice of oil(s) used in the drug delivery composition can be important to achieve the desired dissolution profile of a drug delivery composition in situ in the vitreous of an eye following injection. In some aspects, it may be useful for a drug delivery composition comprising a drug to degrade or dissolve via a process that involves gradual dissolution of the oil phase into the vitreous, followed by clearance of the solvated oil phase from the vitreous. Accordingly, in such instances, it may be useful to utilize a drug delivery composition comprising an oil with a low, but finite solubility, in the vitreous environment.

In various aspects, the choice and concentration of the gelator can be important to ensure biocompatibility and also maintain the integrity of an injected gel after injection into the eye. It was observed that drugs that dissolve into the oil phase tend to have an unfavorable effect on the gelation. This effect can be considered in when choosing the concentration of the gelator. It may be useful, in some instances, to inject a drug delivery composition comprising a drug that can change shape slowly after injection into a sphere. Without wishing to be bound by a particular theory, it is possible that an increase in diameter associated with a spherical geomary would provide an extended release of drug compared to the initial cylindrical geometry (with a smaller overall diameter).

In a further aspect, the injected drug delivery composition can be drug in oil without a gelator. Injection of such a drug delivery composition could provide from the outset a drug loaded sphere, which would provide a slower release of drug compared to a cylindrical geometry, which is associated with a composition comprising a gelator.

In other aspects, the density of a drug delivery composition can be an important factor differences in the relative motion of the drug delivery compositions after injection. For example, a lower density drug delivery composition could result in greater movement in the vitreous and lead to greater interference with the vision. In some aspects, the optimized drug delivery composition would have minimal movement in the vitreous after injection. In a further aspect, incorporation of a surfactant, drug and gelators can increase the oil density in the drug delivery composition, thereby reducing or eliminating rising or buoyancy of the drug delivery composition. In various aspects, the density of an injected drug delivery composition is sufficiently high to provide slow settling of the composition in the vitreous following injection.

Release profiles shown may differ from the expected theoretical values due to other factors as well. The differences in diffusivity of the drug in the oleogel after the particles have dissolved may cause a shift in release times. The particle dissolution will create voids that could be filled either by deformation of the gel or by diffusion of the oil into the voids, which would reduce the effective diffusivity. Alternatively, particle dissolution will cause shrinking of the gel, which would also lead to faster release.

In one aspect, the disclosure relates to a drug delivery composition or drug delivery device comprising an emulsified oleogel composition, wherein the continuous phase oleogel comprises one or more oils and gelator, and the dispersed phase comprises water drops stabilized by a surfactant. In a further aspect, the disclosed emulsified oleogel composition further comprises one or more therapeutic agents. The disclosed emulsified oleogel compositions are relatively cheap and easy to prepare, offer stability to emulsions and other liquid based drug systems, can be thermoreversible, can be resistant to microbial contaminates, and can be formulated with both hydrophilic and hydrophobic drugs. The disclosed emulsified oleogel compositions provide for controlled release of ophthalmic formulations, both for the front and the back of the eye. In some aspects, the disclosed emulsified oleogel compositions can be used for delivery of a therapeutic agent to the back eye via injection of a drug-loaded composition into the vitreous. The disclosed emulsified oleogel compositions can retain a given shape or geometry, such as a cylindrical or spherical geometry, after injection into the vitreous. In some aspects, the disclosed emulsified oleogel compositions have a high viscosity. In some instances, the high viscosity of the emulsified oleogel facilitates maintenance of the initial shape or geometry following injection. In a further aspect, the slow dissolution of an oil in the oleogel will eventually lead to degradation of the injected emulsified oleogel composition.

In a further aspect, an emulsified oleogel composition comprises a dispersed water phase present in an amount from about 0.1 wt % to about 25 wt % based on the weight of the one or more oils and the gelator.

In a further aspect, a disclosed emulsified oleogel composition comprises a dispersed water phase, based on the weight of the one or more oils and the gelator, of about 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, about 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, about 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, about 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, about 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, about 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, about 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, about 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, about 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, about 9.1 wt %, 9.2 wt %, 9.3 wt %, 9.4 wt %, 9.5 wt %, 9.6 wt %, 9.7 wt %, 9.8 wt %, 9.9 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %; a range encompassed by any of the foregoing values; or a set of any of the foregoing values.

In a further aspect, the surfactant in a disclosed emulsified oleogel composition can comprise a suitable surfact, such as, but not limited to, a poloxamer. Poloxamers are sometimes referred to as a Pluronic® polymer or material, e.g., Pluronic F-127 ($PEO_{100}PPO_{64}PEO_{100}$, MW 12,450 Da, 70 wt % PEO), also known as Poloxamer 407, or Pluronic P123 ($PEO_{20}PPO_{70}PEO_{20}$, MW 5750 Da, 30 wt % PEO). Exemplary poloxamers include tri-block copolymers of hydrophilic poly(ethylene oxide) blocks and hydrophobic poly (propylene oxide)-blocks giving a tri-block polymer of PEO-PPO-PEO structure.

In a further aspect, the surfactant in a disclosed emulsified oleogel composition is present in an amount from about 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, about 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, about 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, about 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, about 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, about 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, about 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, about 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, about 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, about 9.1 wt %, 9.2 wt %, 9.3 wt %, 9.4 wt %, 9.5 wt %, 9.6 wt %, 9.7 wt %, 9.8 wt %, 9.9 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %; a range encompassed by any of the foregoing values; or a set of any of the foregoing values.

It is understand herein throughout, an oleogel composition and an emulsified oleogel composition can be used interchangeably in most apsects, e.g., with regard to further comprising of one or more therapeutic agents, the one or more oils therein, the gelator therein, or in a method of using a disclosed oleogel. It is understood that although an oleogel composition and an emulsified oleogel composition can be used interchangeably in most apsects, they may differ in particular aspects of the method of preparing an oleogel comprising an oil phase and a gelator versus preparing an emulsified oleogel.

In various aspects, other known oleogel, oleorod, gels, emulsions, highly viscous formulations, and the like that are suitable for ophthalmological use, e.g., intravitreal injection can be used with the disclosed auto-injector devices. For example, the formulation described in International Patent Appl. No. WO 2019/108602 A1, which is incorporated by reference in its entirety, can be used with the disclosed auto-injector devices in combination with a therapeutic agent as disclosed herein. Other suitable formulations for use in the disclosed auto-injector devices include: (a) a nonconjugated hyaluronic acid gel (see Amin, S., Phelps, R., Goldberg, D. (2006). Mesotherapy for Facial Skin Rejuvenation: A Clinical, Histologic, and Electron Microscopic Evaluation. Dermatologic Surgery, 32: 1467-1472); (b) a nonanimal stabilized hyaluronic acid (NASHA) comprising in part or in toto one or more commercially available hyaluronic acid gel such as those used in breast augmentation and the treatment of wrinkles; (c) a poly(amidoamine) based hydrogel that avoids the initial burst drug release and is capable of providing a sustained release (see U.S. Pat. No. 8,383,153); (d) a formulation incorporating at least in part the vehicle previously described for topical drug delivery in a liposomal cream (see Afzal Hussain, Abdus Samad, Mohammad Ramzan, Mohd Neyaz Ahsan, Zia Ur Rehman & Farhan Jalees Ahmad (2016) Elastic liposome-based gel for topical delivery of 5-fluorouracil: in vitro and in vivo investigation, Drug Delivery, 23:4, 1115-1129); and (e) one or more hydrogel compositions as used in wound dressings such as Granugel® (ConvaTec), Aquaflo™ (Covidien), Woundtab® (First Water), and the like.

Sorbitan monostearate/polysorbate 20 organogels containing drug loaded niosomes. The gels are prepared by the addition of (60° C.) aqueous niosome suspension to a solvent phase (an organic solution of the gelator); a vesicle-in-water-in-oil (v/w/o) emulsion was produced which cools to an opaque, semi-solid, thermoreversible v/w/o gel. In such gels, the vaccine is thought to be entrapped in the niosomes, themselves located within the sorbitan monostearate tubular network in the organic medium. In the publication, the model antigen molecules were bovine serum albumin and haemagglutinin, and the formulation was injected intramuscularly. Murdan, S., Gregoriadis, G., Florence, A. (1999) Sorbitan monostearate/polysorbate 20 organogels containing niosomes: a delivery vehicle for antigens? European Journal of Pharmaceutical Sciences. 8(3): 177-185. Doi: https://doi.org/10.1016/S0928-0987(99)00014-7.

Therapeutic Agents

In various aspects, a disclosed drug delivery composition can comprise a therapeutic agent, such as a drug or a biological, including an antibody therapeutic or therapeutic protein. The therapeutic agent can be any therapeutic agent useful to treat a disease or disorder of the eye. In a further aspect, the therapeutic agent is a tyrosine kinase inhibitor, an antihistamine, an antibiotic, a beta blocker, a steroid, an antineoplastic agent, an antiviral, an immunosuppressive agent, an antioxidant, and combinations thereof. The disclosed drug delivery compositions, e.g., a disclosed oleogel, can be loaded with a variety of agents, including hydrophobic and hydrophilic drugs, at high drug loading concentrations.

In various aspects, a disclosed drug delivery composition can comprise a therapeutic agent, such that the therapeutic agent is present in an amount from about 5 wt % to about 50 wt % based on the weight of the one or more oils, the gelator, and the therapeutic agent. In a further aspect, the therapeutic agent is present in an amount of about 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %, 30.5 wt %, 31 wt %, 31.5 wt %, 32 wt %, 32.5 wt %, 33 wt %, 33.5 wt %, 34 wt %, 34.5 wt %, 35 wt %, 35.5 wt %, 36 wt %, 36.5 wt %, 37 wt %, 37.5 wt %, 38 wt %, 38.5 wt %, 39 wt %, 39.5 wt %, 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt %, 50 wt %; a range encompassed by any of the foregoing values; or a set of any of the foregoing values.

In a further aspect, a disclosed drug delivery composition can comprise a therapeutic agent, such that the therapeutic agent is selected from vancomycin; metformin; dexamethasone and derivatives thereof, e.g., dexamethasone phosphate; timolol; niacin; vancomycin; or combinations thereof; or a pharmaceutically acceptable salt thereof, e.g., a HCl, sodium, or maleate salt.

In a further aspect, a disclosed drug delivery composition can comprise a therapeutic agent, such that the therapeutic agent for an ophthalmological disease such as fluocinolone acetonide; Kenalog; (Bristol Myers Squibb, New York, NY), pegaptanib (Macugen; OSI/Eyetech and Pfizer, New York, NY), bevacizumab (Avastin; Genentech, San Francisco); and ranibizumab (Lucentis; Genentech). Vascular endothelial growth factor (VEGF) trap (Regeneron; Tarrytown, NY) is currently under exploration for treatment of macular degeneration.

In a further aspect, a disclosed drug delivery composition can comprise a therapeutic agent, such that the therapeutic agent is selected from one or more of cyclosporine A, dexamethasone, metformin, timolol, triamcinolone, vancomycin, and pharmaceutically acceptable salts thereof In a further aspect, a disclosed drug delivery composition comprises an tyrosine kinase inhibitor selected from axitinib, cabozantinib, foretinib, regorafenib, pazopanib, ponatinib, motesanib, cediranib, tivozanib, sorafenib, LY2457546, MGCD-265, MGCD-510, pharmaceutically acceptable salts thereof, and any combination of the foregoing. In other asepcts, the tyrosine kinase inhibitor is a derivator of the foregoing tyrosine kinase inhibitors.

In a further aspect, a disclosed drug delivery composition comprises an antihistamine selected from loradatine, hydroxyzine, diphenhydramine, chlorpheniramine, brompheniramine, cyproheptadine, terfenadine, clemastine, triprolidine, carbinoxamine, diphenylpyraline, phenindamine, azatadine, tripelennamine, dexchlorpheniramine, dexbrompheniramine, methdilazine, trimprazine doxylamine, pheniramine, pyrilamine, chiorcyclizine, thonzylamine, and pharmaceutically acceptable salts thereof, and combinations of any of the foregoing. In some aspects, the antihistamine is a derivative of one of the foregoing compounds.

In a further aspect, a disclosed drug delivery composition comprises an antibiotic selected from cefazolin, cephradine, cefaclor, cephapirin, ceftizoxime, cefoperazone, cefotetan, cefutoxime, cefotaxime, cefadroxil, ceftazidime, cephalexin, cephalothin cefamandole, cefoxitin, cefonicid, ceforanide, ceftriaxone, cefadroxil, cephradine, cefuroxime, cyclosporine, ampicillin, amoxicillin, cyclacillin, ampicillin, penicillin G, penicillin V potassium, piperacillin, oxacillin, bacampicillin, cloxacillin, ticarcillin, azlocillin, carbenicillin, methicillin, nafcillin, erythromycin, tetracycline, doxycycline, minocycline, aztreonam, chloramphenicol, ciprofloxacin hydrochloride, clindamycin, metronidazole, gentamicin, lincomycin, tobramycin, vancomycin, polymyxin B sulfate, colistimethate, colistin, azithromycin, augmentin, sulfamethoxazole, trimethoprim, gatifloxacin, ofloxacin, and pharmaceutically acceptable salts thereof, and combinations of any of the foregoing. In some aspects, the antibiotic is a derivative of one of the foregoing compounds.

In a further aspect, a disclosed drug delivery composition comprises an antiviral selected from interferon gamma, zidovudine, amantadine hydrochloride, ribavirin, acyclovir, valciclovir, dideoxycytidine, phosphonoformic acid, ganciclovir, and pharmaceutically acceptable salts thereof, and combinations of any of the foregoing. In some aspects, the antiviral is a derivative of one of the foregoing compounds.

In a further aspect, a disclosed drug delivery composition comprises a beta blocker selected from acebutolol, atenolol, labetalol, metoprolol, propranolol, timolol, and pharmaceutically acceptable salts thereof, and combinations of any of the foregoing. In some aspects, the beta blocket is a derivative of one of the foregoing compounds.

In a further aspect, a disclosed drug delivery composition comprises a steroid, including a corticosteroid, selected from cortisone, prednisolone, flurometholone, dexamethasone, medrysone, loteprednol, fluazacort, hydrocortisone, prednisone, betamethasone, prednisone, methylprednisolone, riameinolone hexacatonide, paramethasone acetate, diflorasone, fluocinonide, fluocinolone, triamcinolone, and pharmaceutically acceptable salts thereof, and combinations of any of the foregoing. In some aspects, the steroid is a derivative of one of the foregoing compounds.

In a further aspect, a disclosed drug delivery composition comprises an antineoplastic agent selected from adriamycin, cyclophosphamide, actinomycin, bleomycin, duanorubicin, doxorubicin, epirubicin, mitomycin, methotrexate, fluorouracil, carboplatin, carmustine (BCNU), methyl-CCNU, cisplatin, etoposide, interferons, camptothecin and derivatives thereof, phenesterine, taxol, taxotere, vinblastine, vincristine, tamoxifen, etoposide, piposulfan, cyclophosphamide, flutamide, and pharmaceutically acceptable salts thereof, and combinations of any of the foregoing. In some aspects, the antineoplastic agent is a derivative of one of the foregoing compounds.

In a further aspect, a disclosed drug delivery composition comprises an immunosuppressive agent selected from voclosporin, cyclosporine, azathioprine, tacrolimus, and pharmaceutically acceptable salts thereof, and combinations of any of the foregoing. In some aspects, the immunosuppressive agent is a derivative of one of the foregoing compounds.

In a further aspect, a disclosed drug delivery composition comprises an antioxidant selected from ascorbate, alpha-tocopherol, mannitol, reduced glutathione, various carotenoids, cysteine, uric acid, taurine, tyrosine, superoxide dismutase, lutein, zeaxanthin, cryotpxanthin, astazanthin, lycopene, N-acetyl-cysteine, carnosine, gamma-glutamyl-cysteine, quercitin, lactoferrin, dihydrolipoic acid, citrate, Ginkgo Biloba extract, tea catechins, bilberry extract, vitamins E or esters of vitamin E, retinyl palmitate, and pharmaceutically acceptable salts thereof, and combinations of any of the foregoing. In some aspects, the antioxidant is a derivative of one of the foregoing compounds.

In a further aspect, a disclosed drug delivery composition can comprise other ophthalmological agents. Examples of such other ophthalmological agents include, but are not limited, to carotenoids, such as lycopene, lutein, zeaxanthin, phytoene, phytofluene, camosic acid; carotenoid derivatives such as carnosol, 6,7-dehydrocarnosic acid, 7-ketocarnosic acid; a zinc source like zinc oxide or a zinc salt like its chloride, acetate, gluconate, carbonate, sulphate, borate, nitrate or silicate salt; copper oxide; vitamin A; vitamin C; vitamin E; β-carotene; and combinations of any of the foregoing.

The disclosed drug delivery composition can comprise a single therapeutic agent or a combination of one or more therapeutic agents. "Combination" means for the purposes of the invention not only a dosage form which contains all the active agents (so-called fixed combinations), and combination packs containing the active agents separate from one another, but also active agents which are administered simultaneously or sequentially, as long as they are employed for the prophylaxis or treatment of the same disease.

In various aspects, a disclosed drug delivery composition comprises a signal transduction inhibitors targeting receptor kinases of the domain families of e.g. VEGFR, PDGFR, FGFR and their respective ligands or other pathway inhibitors like VEGF-Trap (aflibercept), pegaptanib, ranibizumab, sunitinib, ceridanib, pazopanib, bevasiranib, KH-902, mecamylamine, PF-04523655, E-10030, ACU-4429, volociximab, sirolismus, fenretinide, disulfiram, sonepcizumab and/or tandospirone. These agents include, without limitation, antibodies such as Avastin (bevacizumab). These agents also include, by no way of limitation, small-molecule inhibitors such as STI-571/Gleevec (Zvelebil, Curr. Opin. Oncol., Endocr. Metab. Invest. Drugs 2000, 2(1), 74-82), PTK-787 (Wood et al., Cancer Res. 2000, 60(8), 2178-2189), ZD-6474 (Hennequin et al., 92nd AACR Meeting, New Orleans, Mar. 24-28, 2001, abstract 3152), AG-13736 (Herbst et al., Clin. Cancer Res. 2003, 9, 16 (suppl 1), abstract C253), KRN-951 (Taguchi et al., 95th AACR Meeting, Orlando, Fla., 2004, abstract 2575), CP-547,632 (Beebe et al., Cancer Res. 2003, 63, 7301-7309), CP-673,451 (Roberts et al., Proceedings of the American Association of Cancer Research 2004, 45, abstract 3989), CHIR-258 (Lee et al., Proceedings of the American Association of Cancer Research 2004, 45, abstract 2130), MLN-518 (Shen et al., Blood 2003, 102, 11, abstract 476), and AZD-2171 (Hennequin et al., Proceedings of the American Association of Cancer Research 2004, 45, abstract 4539), PKC412, nepafenac.

In various aspects, a therapeutic agent that can be formulated with a disclosed drug delivery composition is a therapeutic agent disclosed in U.S. Pat. Nos. 4,474,451; 4,327,725; and 8,642,067, each of which is incorporated by reference in its entirety.

Methods of Treatment Using the Disclosed Devices

In various aspects, the present disclosure pertains to methods of treating or preventing a clinical condition using a disclosed auto-injector device to deliver a disclosed drug delivery composition comprising one or more therapeutic agent. In some aspects, the clinical condition is a disease or disorder of the eye. In a further aspect, the disclosed methods pertain to treatment of an ophthalmological disorder.

Examples of ophthalmological disorders according to the invention include but are not limited to age-related macular degeneration (AMD), choroidal neovascularization (CNV), choroidal neovascular membrane (CNVM), cystoid macula edema (CME), epi-retinal membrane (ERM) and macular hole, myopia-associated choroidal neovascularisation, vascular streaks, retinal detachment, diabetic retinopathy, diabetic macular edema (DME), atrophic changes of the retinal pigment epithelium (RPE), hypertrophic changes of the retinal pigment epithelium (RPE), retinal vein occlusion, choroidal retinal vein occlusion, macular edema, macular edema due to retinal vein occlusion, retinitis pigmentosa, Stargardt's disease, glaucoma, inflammatory conditions of the eye such as e.g. uveitis, scleritis or endophthalmitis, cataract, refractory anomalies such as e.g. myopia, hyperopia or astigmatism and ceratoconus and retinopathy of prematurity. In addition, examples include but are not limited to angiogenesis in the front of the eye like corneal angiogenesis following e.g. keratitis, corneal transplantation or keratoplasty, corneal angiogenesis due to hypoxia (extensive contact lens wearing), pterygium conjunctivae, subretinal edema and intraretinal edema. Examples of age-related macular degeneration (AMD) include but are not limited to dry or nonexudative AMD, or wet or exudative or neovascular AMD. In a further aspect, the ophthalmological disorder is glaucoma. Alternatively, the ophthalmological disorder is retinal ischemia, including either central retinal ischemia or peripheral retinal ischemia.

The eye comprises several structurally and functionally distinct vascular beds, which supply ocular components critical to the maintenance of vision. These include the retinal and choroidal vasculatures, which supply the inner and outer portions of the retina, respectively, and the limbal vasculature located at the periphery of the cornea. Injuries and diseases that impair the normal structure or function of these vascular beds are among the leading causes of visual impairment and blindness. For example, diabetic retinopathy is the most common disease affecting the retinal vasculature, and is the leading cause of vision loss among the working age population in the United States. Vascularization of the cornea secondary to injury or disease is yet another category of ocular vascular disease that can lead to severe impairment of vision.

"Macular degeneration" is a medical term that applies to any of several disease syndromes which involve a gradual loss or impairment of eyesight due to cell and tissue degeneration of the yellow macular region in the center of the retina. Macular degeneration is often characterized as one of two types, non-exudative (dry form) or exudative (wet form). Although both types are bilateral and progressive, each type may reflect different pathological processes. The wet form of age-related macular degeneration (AMD) is the most common form of choroidal neovascularization and a leading cause of blindness in the elderly. AMD affects millions of Americans over the age of 60, and is the leading cause of new blindness among the elderly. It is characterized and usually diagnosed by the presence of elevated levels of two types of cellular debris within the retina, called drusen and lipofuscin.

In a further aspect, the disclosed method pertains to treatment of an ophthalmological disorder selected from the group comprising age-related macular degeneration (AMD), including wet AMD, choroidal neovascularization (CNV), choroidal neovascular membrane (CNVM), cystoid macula edema (CME), epi-retinal membrane (ERM) and macular hole, myopia-associated choroidal neovascularisation, vascular streaks, retinal detachment, diabetic retinopathy, diabetic macular edema (DME), atrophic changes of the retinal pigment epithelium (RPE), hypertrophic changes of the retinal pigment epithelium (RPE), retinal vein occlusion, choroidal retinal vein occlusion, macular edema, macular edema due to retinal vein occlusion, retinitis pigmentosa, Stargardt's disease, glaucoma, inflammatory conditions, cataract, refractory anomalies, ceratoconus, retinopathy of prematurity, angiogenesis in the front of the eye, corneal angiogenesis following keratitis, corneal transplantation or keratoplasty, corneal angiogenesis due to hypoxia (extensive contact lens wearing), pterygium conjunctivae, subretinal edema and intraretinal edema comprising administering a disclosed drug delivery composition comprising a disclosed therapeutic agent. In some aspects, a disclosed method pertains to administering a disclosed drug delivery composition comprising a disclosed therapeutic agent to a subject that has been diagnosed with an opthamlogic disorder. In a further aspect, a disclosed method pertains to administering a disclosed drug delivery composition comprising a disclosed therapeutic agent to a subject that has been diagnosed with one or more of: (i) macular degeneration, (ii) diabetes-related retinopathy, and (iii) pathological vascularization of the cornea secondary to injury or disease.

In a further aspect, the disclosed method pertains to treatment of a posterior eye disease. Examples of posterior eye diseases include but are not limited to age-related macular degeneration (AMD), choroidal neovascularization (CNV), choroidal neovascular membrane (CNVM), cystoid macula edema (CME), epi-retinal membrane (ERM) and macular hole, myopia-associated choroidal neovascularisation, vascular streaks, retinal detachment, diabetic retinopathy, diabetic macular edema (DME), atrophic changes of the retinal pigment epithelium (RPE), hypertrophic changes of the retinal pigment epithelium (RPE), retinal vein occlusion, choroidal retinal vein occlusion, macular edema, macular edema due to retinal vein occlusion, retinitis pigmentosa, Stargardt's disease and retinopathy of prematurity.

In an aspect, the disclosed method comprises an intravitreal injection of a disclosed drug delivery composition comprising a disclosed therapeutic agent. In a further aspect, the disclosed method comprises injection of a disclosed drug delivery composition comprising a disclosed therapeutic agent via a non-intravitreal route, e.g., the method can comprise one or more of intra-cameral injection, subconjunctiva injection, sub-retinal injection, sub-tenon injection, retrobulbar injection, and suprachoroidal injection of a disclosed drug delivery composition comprising a disclosed therapeutic agent.

In an aspect, the disclosed method comprises injection of a disclosed drug delivery composition comprising a disclosed therapeutic agent near the lower fornix, thereby providing a fornix implant for continuous or nearly continuous delivery of a therapeutic agent via tears of the eye.

In a further aspect, the disclosed method comprises injection of a disclosed drug delivery composition comprising a disclosed therapeutic agent into the canaliculi through the puncta, thereby providing a punctum plug.

In an aspect, the disclosed method comprises a subcutaneous or intramuscular injection another region of the body, e.g., subcutaneous injection in a thigh muscle.

REFERENCES

References are cited herein throughout using the format of reference number(s) enclosed by parentheses corresponding to one or more of the following numbered references. For example, references numbers 1 and 2 immediately herein below would be indicated in the disclosure as [Refs. 1-2], and reference number 1 immediately herein below would be indicated in the disclosure as [Ref. 1].

Ref. 1. Transparency Market Research. (July 2017) Global Ophthalmic Drugs Market. Retrieved from http://www.transparencymarketresearch.com/ophthalmic-drugs-market.html.

Ref. 2. Cunha-Vaz J., Bernardes, R., Lobo, C. Blood-retinal barrier. Eur J Ophthalmol. (2011) 21: S3-S9.

Ref. 3. Duvvuri, S., Majumdar, S., Mitra, A. Drug delivery to the retina: challenges and opportunities. *Expert Opinion on Biological Therapy*. (2003) 3, #1:45-56.

Ref. 4. Gillies, M., Simpson, J., Billson, F., et al. Safety of an Intravitreal Injection of Triamcinolone: Results from a Randomized Clinical Trial. *Arch Ophthalmol*. (2004) 122, #3:336-340.

Ref. 5. A: Rowe-Rendleman, C., Durazo, S., Kompella, U. Drug and Gene Delivery to the Back of the Eye: From Bench to Bedside. Invest Ophthalmol Vis Sci. (2014) 55:2714-2730.

Ref. 6. Myers (Provencher), L., Almeida D., Abràmoff M. Intravitreal Injection Technique: A Primer for Ophthalmology Residents and Fellows. EyeRounds.org. (Jan. 6, 2015). Retrieved from http://www.EyeRounds.org/tutorials/intravitreal-injection/.

Ref. 7. Ghate, D., Edelhauser, H. Ocular drug delivery. Expert Opin Drug Deliv. (2006) 3 #2: 275-287.

Ref. 8. Moshfeghi, D., Kaiser, P., et al. Acute endophthalmitis following intravitreal triamcinolone acetonide injection. *American Journal of Opthalmology*. (2003) 136, #5:791-796.

Ref. 9. Allmendinger, A. Rheological characterization and injection forces of concentrated protein formulations: an alternative predictive model for non-Newtonian Solutions. Eur J Pharm Biopharm. (2014). 87 #2: 318-328.

Ref. 10. Pharmaceutical technology editors. Injecting Highly Viscous Drugs. *Pharmaceutical Technology*. (2014) 38 #11

Ref. 11. Cilurzo, Francesco. Injectability Evaluation: An Open Issue. *AAPS Pharm Sci Tech*. (2011) 12 #2: 604-609.

Ref. 12. Didomenico, A. Measurement and prediction of single and multi-digit finger strength. *Ergonomics*. (2003). 46 #15: 1531-1548.

Ref. 13. Philbrick, D. Medical device OEM's and contract manufacturers: Designing Auto-Injectors for Multiple Drug Viscosities. Economy Spring. Retrieved from https://www.mw-ind.com/whitepapers/auto-injectors/attachment/eco-whitepaper-auto-injectors/.

Ref. 14. Dinikar, C. "Anaphylaxis in Children: Current Understanding and Key Issues in Diagnosis and Treatment." Current Allergy and Asthma Reports. (2012) 12:6 641-649.

Ref. 15. Young, M., Raven, S., Murphy, M. et al. inventors; Meridian Medical Technologies, Inc., assignee. Automatic Injector. U.S. Pat. No. 7,449,012 B2. Nov. 11, 2008.

Ref. 16. Hariprasad, S. "Suprachoroidal Administration for Retinal Drug Delivery" *Retinal Physician*. (2016) 13 20-23.

Ref. 17. Andino, R., Zarnitsyn, V., Yoo, J. et al. inventors; Clearside Biomedial Inc., assignee. Apparatus and Methods for Ocular Injection. U.S. Pat. No. 9,636,253 B1. May 2, 2017.

Ref. 18. Weber, D., Kane, I., Rehal, M. et al. inventors; Allergan, Inc., assignee. Methods and Apparatus for Delivery of Ocular Implants. U.S. Pat. No. 6,899,717 B2. May 31, 2005.

Ref. 19. "My Vision Test." Smaller needles and beveled intravitreal injection technique offer superior results. N.p., 8 Mar. 2011.

Ref. 20. D'souza, A., Shegokar, R. "Polyethylene glycol (PEG): a versatile polymer for pharmaceutical applications." *Expert Opinion on Drug Delivery*. 13:9 1257-1275.

Ref. 21. Kadajji, V., Betageri, G. "Water Soluble Polymers for Pharmaceutical Applications." *Polymers*. 3 1972-2009.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Preliminary tests to determine the efficacy of a representative disclosed auto-injector device were conducted. Mature rabbit eyes acquired from Pel-Freez Biologicals were used for ex vivo injections of oleogel formulations. Oleogel formulations were 80% soybean oil (Spectrum Organics), 10% ethyl cellulose (Sigma-Aldrich), and 10% dexamethasone (Carbosynth Limited). The composition of the oleogel formulation was arbitrary for the OleoJect experiments.

To prepare for the injection procedure, ~0.12 mL of an oleogel formulation was first loaded into a 1 mL syringe. The loading volume was chosen to demonstrate the ability of the disclosed auto-injector device to prepare the dosing amount of 0.03 mL. Syringe loading was performed two methods. In the first method, the oleogel formulation is heated until it melts. The liquid formulation was drawn into the syringe to the desired volume by a 14-gauge needle and plunger. The formulation forms into a gel as it cools, and the 14-gauge needle is removed. In the second method, cooled gel is added directly into the top of the syringe and packed to the bottom by the syringe plunger.

Figure 4A:
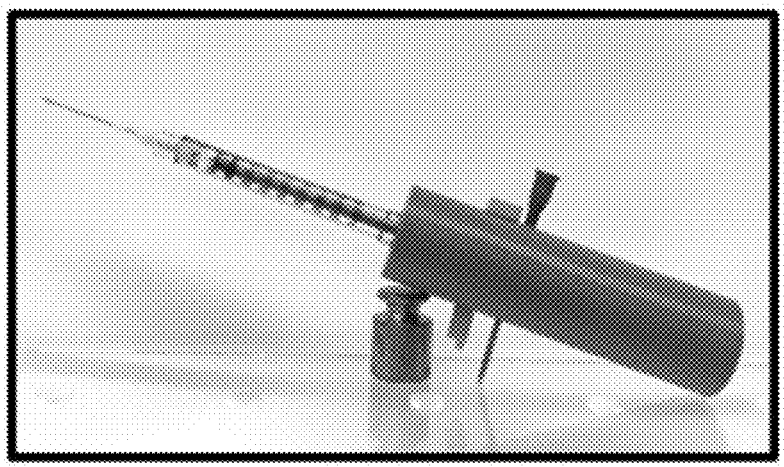
FIGS. 4A-4C show photographic images of a disclosed auto-injector device fitted with a syringe and hypodermic needle representing different stages of use.
Figure 4B:
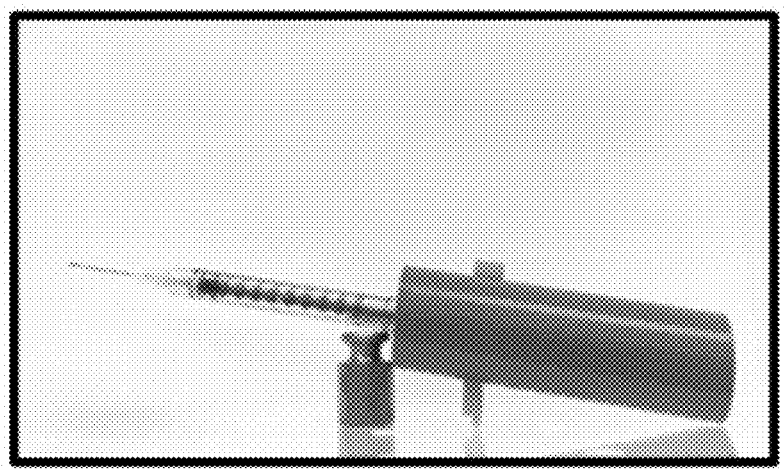
Figure 4C:
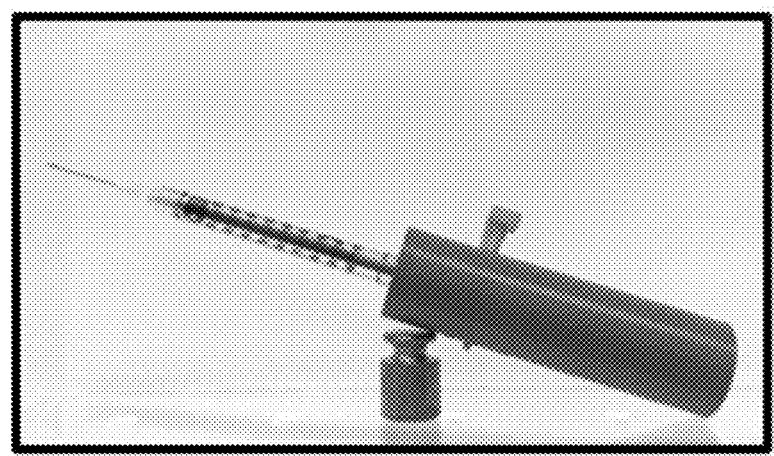
Figure 5:
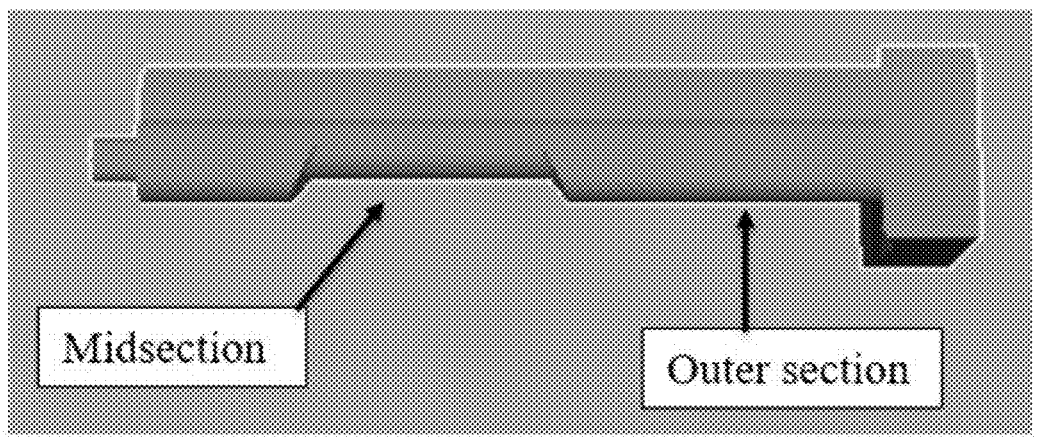
FIG. 5 shows a representative drawing of an injector pin with the mid-section and outer-section indicated.

Before the syringe was added to the auto injector, the device first was assembled. Using a 3D printed hollow tube, the auto injector plunger was inserted into the injector body. The hollow tube was pushed against the plunger with enough force to compress the spring housed inside of the injector body. While pressure was maintained on the plunger against the compressed spring, the preparatory pin was placed into the appropriate hole on the outside of the injector body. The preparatory pin was inserted through the plunger and to secure the plunger in place within the injector body. The hollow tube is then removed, and the injection pin is inserted into the appropriate hole on the outside of the injector body. To complete the assembly of the disclosed auto-injector device, the drug loaded syringe was placed into the injector body and twist locked into place. A 22-gauge needle was added to the syringe. Photographic images of the disclosed auto-injector device prototype used in this example are shown in FIGS. 3-4C.

Frozen rabbit eyes were allowed to thaw to room temperature. The preparatory phase was activated by pulling the preparatory pin from the injector body. The auto injector was held vertically, with the needle pointing downward, as the excess gel released from the needle. Using a shelved injection technique, the needle was inserted into the posterior segment of the eye [19]. The sharp edge of the bevel was used to pierce the eye tissue and position the device to allow for the injection in the target area. The injection phase was activated by pushing in the injection pin. After a few seconds, the auto injector was removed from the rabbit eye, leaving behind the drug formulation in the vitreous. FIGS. 6A-8B show the injection procedure through a series of screen captures of a film of an ex vivo injection.

Figure 6A:
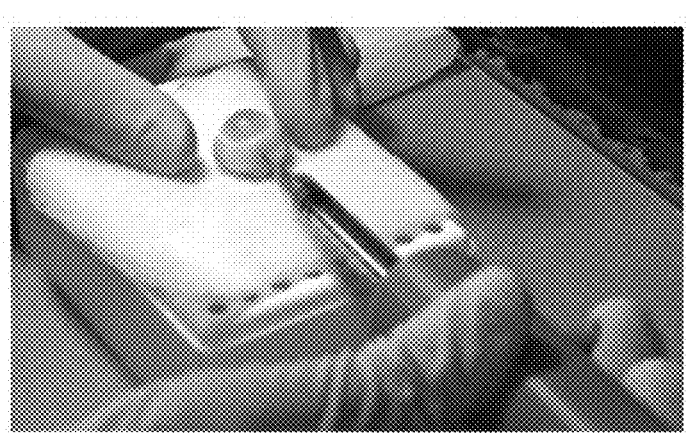
FIGS. 6A-6B show representative photographic images of a disclosed auto-injector device in test use using rabbit cadaver eyes.
Figure 6B:
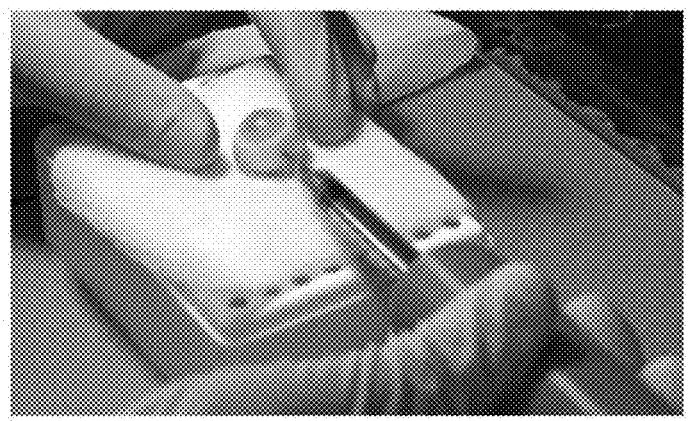

FIG. 6A-6B the disclosed auto-injector device prototype inserted into a rabbit eye. Preparatory pin has already been pulled, but injector pin remains in the unactuated position. Phase 1 has concluded, but phase 2 has not been triggered. In FIG. 6B, the injection pin has been pushed into injector body, releasing the spring, which provides the force to push the plunger. Gel loaded in the syringe is expunged through the needle into the eye.

FIG. 7 shows a photographic image of an oleogel formulation in the eye during injection. Gel was dyed blue for better contrast with the rabbit eye. OleoJect creates a rod-like structure of gel in the eye which remains at the point of injection due to the density and gelatinous nature of the vitreous humor. A doctor skilled in the injection procedure can inject the formulation peripherally.

FIGS. 6A-6B show photographic images injection site and resulting injection wound. In FIG. 6A, the needle is shown inserted through the sclera using the tunneled injection technique. The needle tip is positioned in the vitreous chamber and removed at a 90° angle. In FIG. 6B, the needle is shown removed, and the drug gel formulation dislodged from the bevel and remains in the eye. The 22-gauge needle is small enough to cause a self-sealing wound, which means there is minimal leakage from the injection site.

The ability of the auto-injector equipped with a 22-gauge needle to cause a self-sealing wound is important because it suggests that in the future, a doctor may be able to perform this procedure in-office without the help of a surgical team. In the laboratory, larger needles cause excessive leakage from the wound site, which lead to the rabbit eyes looking "deflated" and losing their structural integrity.

Example 2

This example is prospective example of mitigation of the friction between the gel and the needle or syringe walls by reduction of the friction via addition of a lubricious layer. This will allow the gel to slide out of the needle tip with less obstruction. In this system, the syringe will be split into different compartments, containing different formulations. The first compartment will contain the material which will be used in the lubricious layer. The second compartment will contain the drug formulation. In the preparatory phase, the first compartment material is released. This material is released outside of the eye. Although the first compartment will then be emptied, some traces of the material will remain on the walls of the syringe and the needle, effectively coating it with a lubricious material. In the injection phase, the second compartment will be released, and the gel will easily slide against the coating of lubricious material. The key to this design is the two-phase nature of the auto-injector. The lubricious material from the first compartment cannot be directly injected into the eye because of possible toxicity effects. When the second compartment is released, only a thin coating of lubricious material comes out with the gel, reducing the toxic effects. Potential lubricious film materials include solutions of polyethylene glycol (PEG) or polyvinylpyrrolidone (PVP), polymers that already have extensive use in the pharmaceutical industry [20][21]. This design can also be expanded to include multiple compartments, with multiple materials. Multiple injection stages can be added by modifying the auto-injector to include more than two pins.

The feasibility of this idea can be tested in an experiment in which an oleogel material is first loaded into a 1 mL syringe. Then, solutions of lubricious material can be drawn into the syringe using a 14-gauge needle. The volumes of each respective material loaded can be chosen so that the preparatory phase would release mostly lubricious material and some gel, and the injection phase would release only gel. After both materials are loaded into the syringe, the needle can be switched with a 22-gauge needle, and the entire system connected to the disclosed auto-injector prototype described in Example 1. The injection procedure can then be performed as described above. The injection procedure can be filmed and the film images analyzed to determine if the lubricious material adequately lined the syringe and needle. The velocity of the injection can be compared for trials with lubricious material in the preparatory phase and control trials with no lubricious material. For examples, lubricious materials comprising solutions of PEG and PVP at different concentrations can be tested.

Example 3

This example is prospective example of mitigation of the friction between the gel and the needle or syringe walls by heating the syringe to allow for the gel in the immediate vicinity of the needle to melt resulting in reduction of friction. The heating can be achieved by dipping the assembled device with oleogel loaded in hot water for about 1-5 or 5-10 minutes. Alternatively, the needle can be connected to a circuit to flow electricity that would heat the needle to cause increase in temperature and melting.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A two stage auto-injector device comprising: an injector body, a syringe plunger, a compression spring, a preparatory pin, an injection pin, and optionally a syringe including a first compartment including a lubricious material and a second compartment including a drug delivery composition, wherein the compression spring is compressed inside the injector body such that syringe plunger is locked into place by the preparatory pin, wherein the preparatory pin is positioned through a first body preparatory pin opening in the injector body, and a syringe plunger pin slot, and a second body preparatory pin opening on the other side, wherein the preparatory pin, when locked into place, prevents the compressed spring from moving the syringe plunger, wherein the injection pin is positioned in a hole in the injector body, wherein in a first stage the device is configured to release the lubricious material upon removal of the preparatory pin, wherein in a second stage, that follows the first stage, the device is configured to release the drug delivery composition upon removal of the injection pin.

2. The two stage auto-injector device of claim 1, wherein the auto-injector body has an elongated shape with a cavity therein having a longitudinal axis; wherein the cavity has a closed end at one end of the longitudinal axis and an open end distal to the closed end; wherein the injector body has the first body preparatory pin opening, the second body preparatory pin opening, and a body injection pin opening; wherein the compression spring has a first end and a second end; wherein the syringe plunger has the syringe plunger pin slot, a syringe plunger spring contact end, and a syringe plunger body end; wherein the compression first end is in contact with the closed end; wherein the compression second end is contact with the syringe plunger spring contact end of the syringe plunger; wherein the syringe plunger body end of the syringe plunger engages the injection pin passing through the body preparatory pin opening and through the syringe plunger pin slot at a position proximal to syringe plunger spring contact end; wherein the injection pin comprises an injection pin mid-section and an injection pin outer-section; wherein the injection pin mid-section has a longitudinal edge that is disposed closer to the center of the injection pin than a longitudinal edge of the outer-section; and wherein the injection pin can pass through the body injection pin opening and engage with the syringe plunger pin slot.

3. A two stage auto-injector device comprising: an injector body, a syringe plunger, a compression spring, a preparatory pin, and an injection pin, wherein the compression spring is compressed inside the injector body such that syringe plunger is locked into place by the preparatory pin, wherein the preparatory pin is positioned through a first body preparatory pin opening in the injector body, and a syringe plunger pin slot, and a second body preparatory pin opening on the other side, wherein the preparatory pin, when locked into place, prevents the compressed spring from moving the syringe plunger, wherein the injection pin is positioned in a hole in the injector body, wherein in a first stage the device is configured to release a first material upon removal of the preparatory pin, wherein in a second stage, that follows the first stage, the device is configured to release a second material upon removal of the injection pin.

4. The two stage auto-injector device of claim 3, wherein the auto-injector body has an elongated shape with a cavity therein having a longitudinal axis; wherein the cavity has a closed end at one end of the longitudinal axis and an open end distal to the closed end; wherein the injector body has the first body preparatory pin opening, the second body preparatory pin opening, and a body injection pin opening; wherein the compression spring has a first end and a second end; wherein the syringe plunger has the syringe plunger pin slot, a syringe plunger spring contact end, and a syringe plunger body end; wherein the compression first end is in contact with the closed end; wherein the compression second end is contact with the syringe plunger spring contact end of the syringe plunger; wherein the syringe plunger body end of the syringe plunger engages the injection pin passing through the body preparatory pin opening and through the syringe plunger pin slot at a position proximal to syringe plunger spring contact end; wherein the injection pin comprises an injection pin mid-section and an injection pin outer-section; wherein the injection pin mid-section has a longitudinal edge that is disposed closer to the center of the injection pin than a longitudinal edge of the outer-section; and wherein the injection pin can pass through the body injection pin opening and engage with the syringe plunger pin slot.

5. An auto-injector device comprising:
an auto-injector injector body;
an auto-injector syringe plunger;
an auto-injector spring;
an auto-injector preparatory pin; and
an auto-injector injection pin;
wherein the auto-injector body has an elongated shape with a cavity therein having a longitudinal axis;
wherein the cavity has a closed end at one end of the longitudinal axis and an open end distal to the closed end;
wherein the auto-injector body has a first body preparatory pin opening, a second body preparatory pin opening, and a body injection pin opening;
wherein the auto-injector spring has a first end and a second end;
wherein the auto-injector syringe plunger has a syringe plunger pin slot, a syringe plunger spring contact end, and a syringe plunger body end;
wherein the auto-injector spring first end is contact with the closed end;
wherein the auto-injector spring second end is contact with the syringe plunger spring contact end of the auto-injector syringe plunger;
wherein the syringe plunger body end of the auto-injector syringe plunger engages the auto-injector injection pin passing through the body preparatory pin opening and through the syringe plunger pin slot at a position proximal to syringe plunger spring contact end;
wherein the auto-injector injection pin comprises an injection pin mid-section and an injection pin outer-section;
wherein the injection pin mid-section has a longitudinal edge that is disposed closer to the center of the injection pin than a longitudinal edge of the outer-section; and
wherein the injection pin can pass through the body injection pin open and engage with the syringe plunger pin slot.

* * * * *